United States Patent
Ucar et al.

(10) Patent No.: US 12,337,846 B2
(45) Date of Patent: Jun. 24, 2025

(54) SYSTEMS AND METHODS TO MANAGE DRIVERS UNDER ABNORMAL DRIVING

(71) Applicant: TOYOTA MOTOR ENGINEERING & MANUFACTURING NORTH AMERICA, INC., Plano, TX (US)

(72) Inventors: Seyhan Ucar, Mountain View, CA (US); Tomohiro Matsuda, Mountain View, CA (US); Emrah Akin Sisbot, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 17/959,866

(22) Filed: Oct. 4, 2022

(65) Prior Publication Data
US 2024/0109541 A1   Apr. 4, 2024

(51) Int. Cl.
*B60W 40/04*   (2006.01)
*B60W 30/12*   (2020.01)

(52) U.S. Cl.
CPC ............ *B60W 40/04* (2013.01); *B60W 30/12* (2013.01); *B60W 2554/4046* (2020.02); *B60W 2554/80* (2020.02); *B60W 2556/10* (2020.02)

(58) Field of Classification Search
CPC .. B60W 40/04; B60W 30/12; B60W 2556/10; B60W 2554/80; B60W 2554/4046
See application file for complete search history.

(56) References Cited

U.S. PATENT DOCUMENTS

| 8,948,929 B2 | 2/2015 | Chun |
| 10,239,528 B2 | 3/2019 | Oh |

(Continued)

FOREIGN PATENT DOCUMENTS

| CN | 110550038 B | 2/2021 |
| KR | 102052831 B1 | 12/2019 |

OTHER PUBLICATIONS

Ucar et al., "Mining Movement Patterns for Distracted Driving Detection," 28th ITS World Congress 2022, Sep. 2022, Paper ID 1211936, 7 pages.

(Continued)

*Primary Examiner* — Vivek D Koppikar
*Assistant Examiner* — Jeffrey R Chalhoub
(74) *Attorney, Agent, or Firm* — SHEPPARD, MULLIN, RICHTER & HAMPTON LLP; Daniel N. Yannuzzi

(57) ABSTRACT

Systems and methods are provided for detecting when a vehicle engages in anomalous driving behavior and managing nearby vehicles to mitigate risk to the nearby vehicles due to the anomalous driving behavior. According to some embodiments, the methods and systems comprise receiving an indication that an anomalous driving behavior of a first vehicle is detected, and identifying a plurality of vehicles within a geographic area of the first vehicle based on receiving the indication. The methods and systems further include generating an arrangement for the plurality of vehicles based on the detected anomalous driving behavior, determining a target speed for each of the plurality of vehicles based on the determined arrangement and a current speed of each of the plurality of vehicles, and communicating control messages to each of the plurality of vehicles. The control messages comprising the target speed to distribute the plurality of vehicles into the determined arrangement.

20 Claims, 9 Drawing Sheets

(56) References Cited

U.S. PATENT DOCUMENTS

| | | | |
|---|---|---|---|
| 10,347,127 B2 | 7/2019 | Droz | |
| 10,775,179 B1 | 9/2020 | Hayward | |
| 11,077,850 B2 | 8/2021 | Green | |
| 11,110,924 B2 | 9/2021 | Kumara | |
| 2020/0216075 A1 | 7/2020 | Park | |
| 2020/0398837 A1* | 12/2020 | Kumara | B60W 30/16 |
| 2021/0070286 A1* | 3/2021 | Green | G06V 10/25 |
| 2021/0074154 A1* | 3/2021 | Ucar | G08G 1/096725 |
| 2022/0101726 A1* | 3/2022 | Fields | G08G 1/096741 |

OTHER PUBLICATIONS

Singh, "Critical Reasons for Crashes Investigated in the National Motor Vehicle Crash Causation Survey," Traffic Safety Facts Crash•Stats, Report No. DOT HS 812 506, Mar. 2018, National Highway Traffic Safety Administration (https://crashstats.nhtsa.dot.gov/Api/Public/Publication/812506).

"Distracted Driving in America: A Public Safety Crisis," Selective Insurance Group, Inc., 1 page (https://www.selective.com/~/media/Files/S/Selective-V2/documents/pdf-links/Distracted-Driving-Infographic.pdf).

"Global Status Report on Road Safety 2018," World Health Organization (WHO), Management of Noncommunicable Diseases, Disability, Violence and Injury Prevention (NVI), Jun. 17, 2018, 424 pages (https://www.who.int/publications/i/item/9789241565684).

Mercer et al., "Matrix Profile XXIII: Contrast Profile: A Novel Time Series Primitive that Allows Real World Classification," 2021 IEEE International Conference on Data Mining (ICDM), Dec. 8, 2021, 10 pages (http://www.cs.ucr.edu/~eamonn/ContrastProfile_V048_names.pdf).

* cited by examiner

SYSTEMS AND METHODS TO MANAGE DRIVERS UNDER ABNORMAL DRIVING

TECHNICAL FIELD

The present disclosure relates generally to systems and methods for detecting anomalous driving, and, more particularly, some embodiments relate to detecting when a driver engages in anomalous driving behavior and managing nearby drivers to mitigate risk due to the anomalous driving behavior.

DESCRIPTION OF RELATED ART

Traditional traffic law enforcement and control measures, such as police force efforts and insurance repercussions, are relatively effective at addressing serious anomalous driving behavior, i.e., through fines, penalties and in worst cases, criminal charges that may result in loss of driving privileges or penitentiary sentencing. However, small scale anomalous behavior by drivers who in engage in aggressive/distracted/reckless (ADR) driving are more difficult for the traditional enforcement infrastructure to detect, much less address. Examples of ADR driving behaviors, include, but are not limited to, tailgating, quick lane changes without leaving safe distance between the lane changing vehicle and a following vehicle (e.g., cutting off a fellow driver), swerving, delayed reaction times, running green lights, changing lanes without signaling, and so on.

Moreover, the occurrence of anomalous driving behavior may jeopardize safety of other roadway participants (e.g., vehicles, drivers, passengers, pedestrians, bikers, etc.). For example, over half of all accidents in the US include at least one aggressive driver and most rear-end collisions are due to distracted and/or reckless driving behavior. Additionally, anomalous driving behavior may also reduce efficiency of a transportation system in the roadway environment.

BRIEF SUMMARY OF THE DISCLOSURE

According to various embodiments of the disclosed technology, systems and methods for managing vehicles to mitigate risk to the vehicles due to anomalous driving behavior are provided.

In accordance with some embodiments, a method for mitigating risk due to anomalous driving behavior is provided. The method comprises receiving an indication that an anomalous driving behavior of a first vehicle is detected, and identifying a plurality of vehicles within a geographic area of the first vehicle based on receiving the indication. The method further includes generating an arrangement for the plurality of vehicles based on the detected anomalous driving behavior, determining a target speed for each of the plurality of vehicles based on the determined arrangement and a current speed of each of the plurality of vehicles, and communicating control messages to each of the plurality of vehicles. The control messages comprising the target speed to distribute the plurality of vehicles into the determined arrangement.

In another aspect, a system mitigating risk due to anomalous driving behavior is provided that comprises a communication circuit configured to exchange communications between the system and connected vehicles, a memory storing instructions, and one or more processors communicably coupled to the memory. The one or more processors are configured to execute the instructions to receive an indication that an anomalous driving behavior of a first vehicle is detected, and identify a plurality of vehicles within a geographic area of the first vehicle based on receiving the indication. The one or more processors are further configured to execute the instructions to determine an arrangement for the plurality of vehicles based on the detected anomalous driving behavior of the first vehicle, determine a target speed for each of the plurality of vehicles based on the determined arrangement and a current speed of each of the plurality of vehicles, and communicate control messages to each of the plurality of vehicles, the control messages comprising the target speed to distribute the plurality of vehicles into the determined arrangement.

In another aspect, a non-transitory machine-readable medium is provided. The non-transitory computer-readable medium includes instructions that when executed by a processor cause the processor to perform operations including receiving a notification message indicative that an anomaly is detected within a roadway environment, the roadway environment comprises a plurality of vehicles surrounding the anomaly, the anomaly comprising a traveling direction within roadway environment. The operations further include identifying one or more vehicles of the plurality of vehicles that are forward of the anomaly along the traveling direction based on receiving the notification message and determining mitigated risk positions for each of the identified one or more vehicles, the mitigated risk positions maintaining a lane position of the one or more vehicles from when the anomaly was detected. The operations further include deriving a target speed for each of the one or more identified vehicles configured to guide the identified one or more vehicles into the respective mitigated risk positions, and transmit a control message to each of the identified one or more identified vehicles, the control message comprising the comprising the target speed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
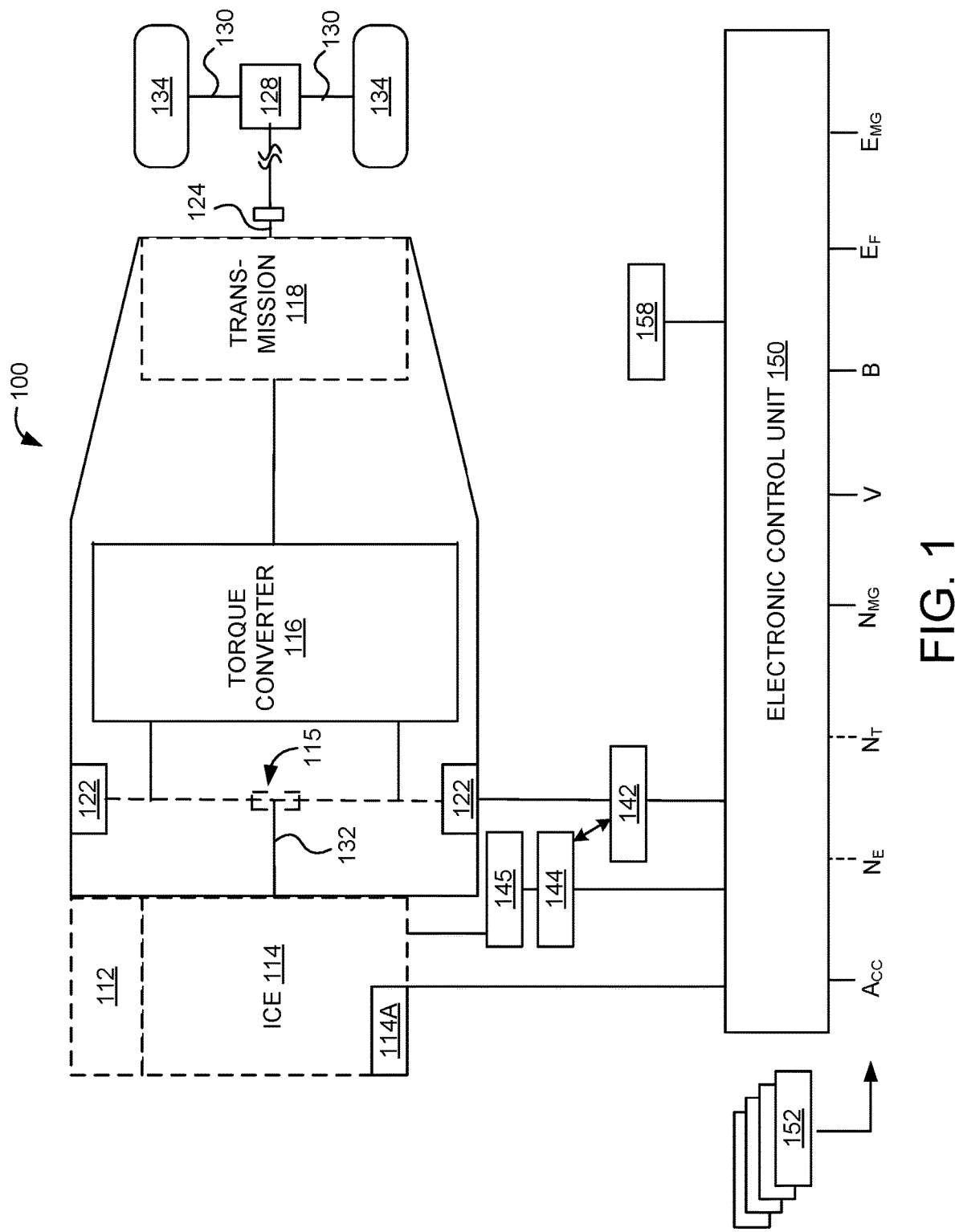
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As described above, an occurrence of anomalous driving behavior can jeopardize safety of other roadway participants (e.g., vehicles, drivers, passengers, pedestrians, bikers, etc.) and may reduce efficiency of a transportation system in the roadway environment. Thus, embodiments may be configured to detect an occurrence of anomalous driving behavior and take remedial action to mitigate risk imparted to other vehicles due to anomalous driving behavior by managing the travel of other vehicles in the vicinity of the detected anomalous driving behavior.

If the other vehicles in the vicinity of anomalous driving behavior are improperly managed and/or are not coordinated, the risks attributed to the presence of anomalous driving behavior could be propagated to the nearby vehicles and increase a likelihood of collisions. For example, typical aggressive driving behavior may be evidenced by rapid fluctuations in following distance between a following vehicle and a leading vehicle. The following vehicle may approach the rear of a leading vehicle at high speed and, upon getting close the leading vehicle, suddenly slow down to a further distance behind the leading vehicle. The following vehicle may then accelerate again to return to the close distance, and repeat the process numerous times. Upon noticing the aggressive following vehicle, the leading vehicle may intuitively perform an evasive lane change to avoid the aggressive vehicle and/or permit the aggressive following vehicle to pass. At the same time, the aggressive vehicle may perform a lane change, into the same lane that the leading vehicle is changing to, at high speed as a part of weaving maneuver in an attempt to pass the leading vehicle. An adjacent vehicle traveling in the same lane, seeing the aggressive driving behavior, may also increase its speed to create space for the aggressive vehicle to complete the risky lane change. However, since the leading vehicle and the adjacent vehicle are separately controlled and the evasive maneuvers are not coordinated, the leading vehicle could change lanes into the lane of the adjacent vehicle, and, since the adjacent vehicle has accelerated, a collision may occur between the leading vehicle and adjacent vehicle. Similarly, other vehicles in the area may perform evasive maneuvers due to the presence of the aggressive driver and/or collision, resulting in additional increases in collision risk. Thus, when risks of evasive maneuvers (such as lane changes) are combined with risks of anomalous driving behavior, the roadway situations become more challenging.

Conventional systems for managing vehicles under anomalous driving behavior have been proposed. In the conventional systems, control instructions are provided to vehicles within the vicinity of detected anomalous driving behavior to move the vehicles away (e.g., perform lane changes) from the anomalous driving behavior. However, as described above, there are drawbacks in guiding vehicles away from anomalous driving behavior, which can increase the risk of collision. Drivers intuitively perform evasive maneuvers to stay away from anomalous driving behavior and such maneuvers may lead to fatal crashes and/or further increase the risk of collisions.

Accordingly, different from the conventional solutions, embodiments of the systems and methods disclosed herein manage vehicles' speeds within the vicinity (e.g., a defined geographic area) of a detected anomalous driving behavior in a manner to mitigate risks to the nearby vehicles due to the detected anomalous driving behavior, while maintaining current lane configurations. For example, embodiments of the present disclosure detect anomalous driving behavior of a vehicle (referred to herein as "ADR vehicle"), identify connected vehicles within a defined geographic area of the ADR vehicle, and determine an arrangement of the identified vehicles comprising a path through which the ADR vehicle can safely navigate, without requiring the ADR vehicle to alter from the anomalous driving behavior. Embodiments disclosed herein determine a target speed for each of the identified vehicles and communicate instructions including the respective target speed to each identified vehicle. The identified vehicles can then be controlled (either autonomously, semi-autonomously, and/or manually by a driver) according to the instructions so to alter their respective actual speeds to match their target speeds, thereby coordinating the identified vehicles into the determined arrangement.

The ADR vehicle can then proceed along a path through or around the identified vehicles in the determined arrangement, without being forced to alter the anomalous driving behavior. For example, the determined arrangement can distribute the identified vehicles within the defined geographic area of the ADR vehicle and provide gaps between each identified vehicle that are sufficient in length for the ADR vehicle to navigate through with reduced risk to the identified vehicles. The path through the determined arrangement can traverse between lanes and around one or more identified vehicles, such that the aggressive vehicle can weave through the arrangement of identified vehicles.

The disclosed embodiments therefore do not force the ADR vehicle to alter the anomalous driving behavior, which can increase driver acceptance and usage of the embodiments disclosed herein. For example, the driver of the ADR vehicle can continue a preferred anomalous driving style, which can increase acceptance on the part of an ADR driver. Similarly, since risks of collision are reduced by permitting the ADR driver to pass the identified vehicles with minimal alteration to the identified vehicles directional heading and preferred driving styles, the drivers of the identified vehicles are more likely to accept the communicated instructions so to arrange the identified vehicles as instructed. Increased acceptance of the embodiments by all involved drivers provides for increased mitigation of risk and reduced chance of collision.

Accordingly, embodiments disclosed herein provide improvements over the conventional solutions, by determining target speeds to coordinate vehicles into a determined arrangement through or around which an ADR vehicle can pass. While some embodiments disclosed herein can provide lane change suggestions to achieve the determined arrangement, maintaining lane configuration and adjusting speed of the identified vehicles may reduce a collision risk since the anomalous driving behavior is not propagated to other vehicles (e.g., the other vehicles do not perform evasive lane changes). Furthermore, the ADR vehicle can continue with anomalous driving behavior unperturbed while the nearby vehicles continue to travel in a safe manner.

As used herein, the words "geographic location," "location," "geographic position" and "position" refer to a latitude and longitude of an object (or, a latitude, longitude, and elevation of an object), such as a vehicle, a roadside equipment/unit, etc. As used herein, the words "geographic area", "area," and "region" refer to a physical space surrounding a geographic location and/or object (e.g., an area of defined space surrounding a geographic location or position). In the case of a traveling object (e.g., a vehicle) the geographic area or region can travel with the object.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for remote vehicular micro cloud formation can be implemented in other types of vehicles including gasoline- or diesel-powered vehicles, fuel-cell vehicles, electric vehicles, or other vehicles.

FIG. 1 illustrates a drive system of an example vehicle 100 that may include an internal combustion engine 114 and one or more electric motors 122 (which may also serve as generators) as sources of motive power. Driving force generated by the internal combustion engine 114 and motors 122 can be transmitted to one or more wheels 134 via a torque converter 116, a transmission 118, a differential gear device 128, and a pair of axles 130.

As an HEV, vehicle 100 may be driven/powered with either or both of engine 114 and the motor(s) 122 as the drive source for travel. For example, a first travel mode may be an engine-only travel mode that only uses internal combustion engine 114 as the source of motive power. A second travel mode may be an EV travel mode that only uses the motor(s) 122 as the source of motive power. A third travel mode may be an HEV travel mode that uses engine 114 and the motor(s) 122 as the sources of motive power. In the engine-only and HEV travel modes, vehicle 100 relies on the motive force generated at least by internal combustion engine 114, and a clutch 115 may be included to engage engine 114. In the EV travel mode, vehicle 100 is powered by the motive force generated by motor 122 while engine 114 may be stopped and clutch 115 disengaged.

Engine 114 can be an internal combustion engine such as a gasoline, diesel or similarly powered engine in which fuel is injected into and combusted in a combustion chamber. A cooling system 112 can be provided to cool the engine 114 such as, for example, by removing excess heat from engine 114. For example, cooling system 112 can be implemented to include a radiator, a water pump and a series of cooling channels. In operation, the water pump circulates coolant through the engine 114 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 114. In other applications, either or both the water pump and the fan may be operated by electric current such as from battery 144.

An output control circuit 114A may be provided to control drive (output torque) of engine 114. Output control circuit 114A may include a throttle actuator to control an electronic throttle valve that controls fuel injection, an ignition device that controls ignition timing, and the like. Output control circuit 114A may execute output control of engine 114 according to a command control signal(s) supplied from an electronic control unit 150, described below. Such output control can include, for example, throttle control, fuel injection control, and ignition timing control.

Motor 122 can also be used to provide motive power in vehicle 100 and is powered electrically via a battery 144. Battery 144 may be implemented as one or more batteries or other power storage devices including, for example, lead-acid batteries, nickel-metal hydride batteries, lithium ion batteries, capacitive storage devices, and so on. Battery 144 may be charged by a battery charger 145 that receives energy from internal combustion engine 114. For example, an alternator or generator may be coupled directly or indirectly to a drive shaft of internal combustion engine 114 to generate an electrical current as a result of the operation of internal combustion engine 114. A clutch can be included to engage/disengage the battery charger 145. Battery 144 may also be charged by motor 122 such as, for example, by regenerative braking or by coasting during which time motor 122 operate as generator.

Motor 122 can be powered by battery 144 to generate a motive force to move the vehicle and adjust vehicle speed. Motor 122 can also function as a generator to generate electrical power such as, for example, when coasting or braking. Battery 144 may also be used to power other electrical or electronic systems in the vehicle. Motor 122 may be connected to battery 144 via an inverter 142. Battery 144 can include, for example, one or more batteries, capacitive storage units, or other storage reservoirs suitable for storing electrical energy that can be used to power motor 122. When battery 144 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 150 (described below) may be included and may control the electric drive components of the vehicle as well as other vehicle components. For example, electronic control unit 150 may control inverter 142, adjust driving current supplied to motor 122, and adjust the current received from motor 122 during regenerative coasting and breaking. As a more particular example, output torque of the motor 122 can be increased or decreased by electronic control unit 150 through the inverter 142.

A torque converter 116 can be included to control the application of power from engine 114 and motor 122 to transmission 118. Torque converter 116 can include a viscous fluid coupling that transfers rotational power from the motive power source to the driveshaft via the transmission. Torque converter 116 can include a conventional torque converter or a lockup torque converter. In other embodiments, a mechanical clutch can be used in place of torque converter 116.

Clutch 115 can be included to engage and disengage engine 114 from the drivetrain of the vehicle. In the illustrated example, a crankshaft 132, which is an output member of engine 114, may be selectively coupled to the motor 122 and torque converter 116 via clutch 115. Clutch 115 can be implemented as, for example, a multiple disc type hydraulic frictional engagement device whose engagement is controlled by an actuator such as a hydraulic actuator. Clutch 115 may be controlled such that its engagement state is complete engagement, slip engagement, and complete disengagement complete disengagement, depending on the pressure applied to the clutch. For example, a torque capacity of clutch 115 may be controlled according to the hydraulic pressure supplied from a hydraulic control circuit (not illustrated). When clutch 115 is engaged, power transmission is provided in the power transmission path between the crankshaft 132 and torque converter 116. On the other hand, when clutch 115 is disengaged, motive power from engine 114 is not delivered to the torque converter 116. In a slip engagement state, clutch 115 is engaged, and motive power is provided to torque converter 116 according to a torque capacity (transmission torque) of the clutch 115.

As alluded to above, vehicle 100 may include an electronic control unit 150. Electronic control unit 150 may include circuitry to control various aspects of the vehicle operation. Electronic control unit 150 may include, for example, a microcomputer that includes a one or more processing units (e.g., microprocessors), memory storage (e.g., RAM, ROM, etc.), and I/O devices. The processing units of electronic control unit 150, execute instructions stored in memory to control one or more electrical systems or subsystems 158 in the vehicle. Electronic control unit 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 150 receives information from a plurality of sensors included in vehicle 100. For example, electronic control unit 150 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 114 (engine RPM), a rotational speed, NMG, of the motor 122 (motor rotational speed), and vehicle speed, NV. These may also include torque converter 116 output, NT (e.g., output amps indicative of motor output), brake operation amount/pressure, B, battery SOC (i.e., the charged amount for battery 144 detected by an SOC sensor). Accordingly, vehicle 100 can include a plurality of sensors 152 that can be used to detect various conditions internal or external to the vehicle and provide sensed conditions to engine control unit 150 (which, again, may be implemented as one or a plurality of individual control circuits). In one embodiment, sensors 152 may be included to detect one or more conditions directly or indirectly such as, for example, fuel efficiency, EF, motor efficiency, EMG, hybrid (internal combustion engine 114+MG 112) efficiency, acceleration, ACC, etc.

In some embodiments, one or more of the sensors 152 may include their own processing capability to compute the results for additional information that can be provided to electronic control unit 150. In other embodiments, one or more sensors may be data-gathering-only sensors that provide only raw data to electronic control unit 150. In further embodiments, hybrid sensors may be included that provide a combination of raw data and processed data to electronic control unit 150. Sensors 152 may provide an analog output or a digital output.

Sensors 152 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect objects in an environment surrounding vehicle 100, for example, traffic signs indicating a current speed limit, road curvature, obstacles, surrounding vehicles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
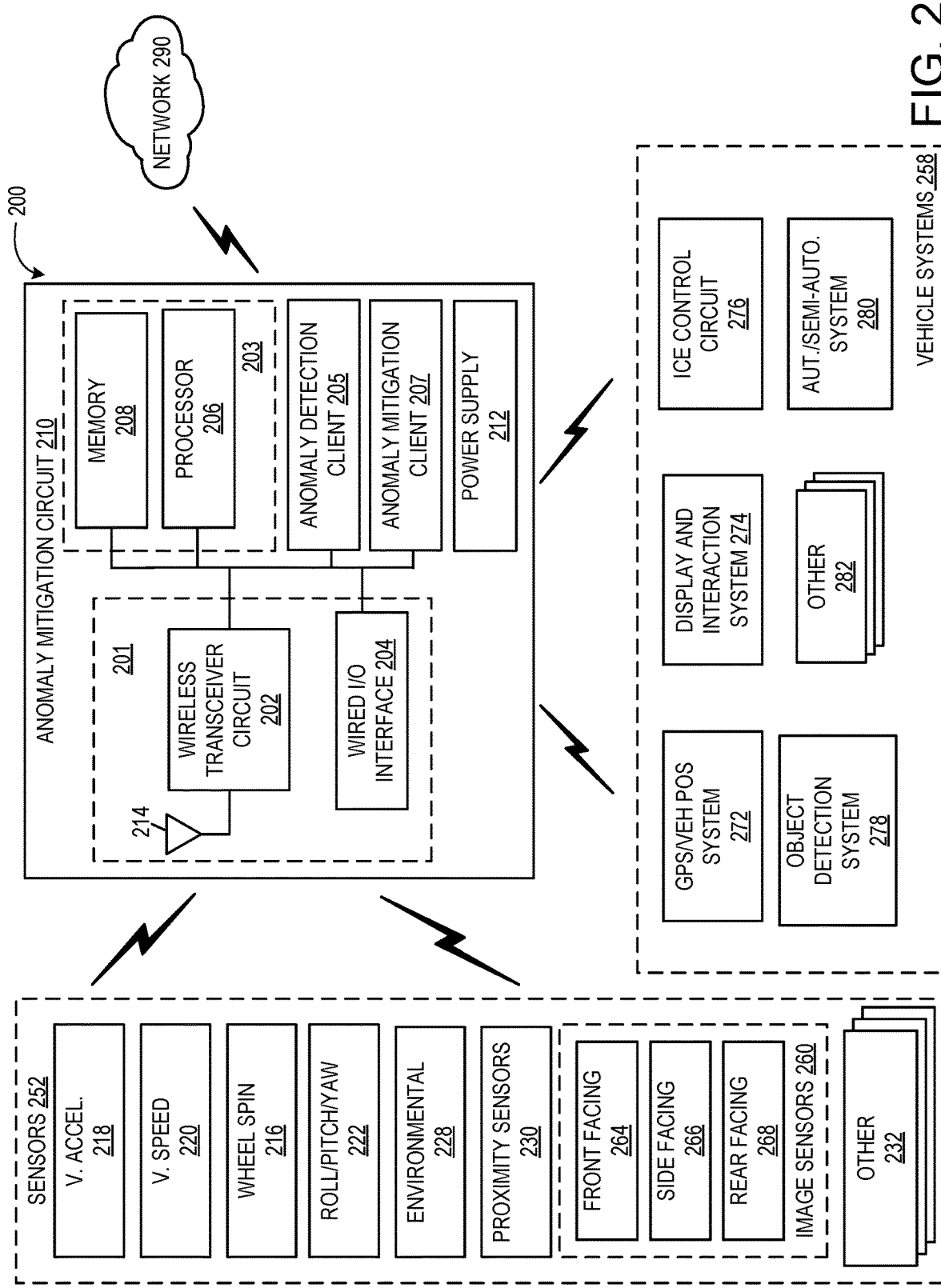
FIG. 2 illustrates an example architecture for mitigating anomalous driving behavior in accordance with one embodiment of the systems and methods described herein.

FIG. 2 illustrates an example architecture for mitigating anomalous driving behavior in accordance with one embodiment of the systems and methods described herein. Referring now to FIG. 2, in this example, anomaly mitigation system 200 includes an anomaly mitigation circuit 210, a plurality of sensors 252 and a plurality of vehicle systems 258. Sensors 252 (such as sensors 152 described in connection with FIG. 1) and vehicle systems 258 (such as systems 158 described in connection with FIG. 1) can communicate with anomaly mitigation circuit 210 via a wired or wireless communication interface. Although sensors 252 and vehicle systems 258 are depicted as communicating with anomaly mitigation circuit 210, they can also communicate with each other as well as with other vehicle systems. Anomaly mitigation circuit 210 can be implemented as an ECU or as part of an ECU such as, for example electronic control unit 150. In other embodiments, anomaly mitigation circuit 210 can be implemented independently of the ECU.

Anomaly mitigation circuit 210 in this example includes a communication circuit 201, a decision circuit 203 (including a processor 206 and memory 208 in this example) and a power supply 212. Components of anomaly mitigation circuit 210 are illustrated as communicating with each other via a data bus, although other communication in interfaces can be included. Anomaly mitigation circuit 210 in this example also includes anomaly detection client 205 that can be operated to detect anomalous driving behavior from sensors 252 and/or vehicle systems 258 and notify an edge/cloud server (e.g., server 310) of detected anomalous driving behavior via network 290. Anomaly mitigation circuit 210 also includes anomaly mitigation client 207 that can be operated to receive anomalous driving behavior mitigation data, such as target speed data. U.S. Pat. No. 11,414,088, the disclosure of which is incorporated herein by reference in its entirety, provides an example implementation of anomaly detection client 205.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: position data; vehicle speed data; risk mitigation data; and anomaly data, as described below, along with other data as needed. Memory 208 can be made up of one or more modules of one or more different types of memory, and may be configured to store data and other information as well as operational instructions that may be used by the processor 206 to anomaly mitigation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an anomaly mitigation circuit 210.

Communication circuit 201 includes either or both a wireless transceiver circuit 202 with an associated antenna 214 and a wired I/O interface 204 with an associated hardwired data port (not illustrated). Communication circuit 201 can provide for V2X and/or V2V communications capabilities, allowing anomaly mitigation circuit 210 to communicate with edge devices, such as roadside unit/equipment (RSU/RSE), network cloud servers and cloud-based databases, and/or other vehicles via network 290. For example, V2X communication capabilities allows anomaly mitigation circuit 210 to communicate with edge/cloud devices, roadside infrastructure (e.g., such as roadside equipment/roadside unit, which may be a vehicle-to-infrastructure (V2I)-enabled street light or cameras, for example), etc. Anomaly mitigation circuit 210 may also communicate with other connected vehicles over vehicle-to-vehicle (V2V) communications.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As this example illustrates, communications with anomaly mitigation circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by anomaly mitigation circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 152 such as those described above with reference to the example of FIG. 1. Sensors 252 can include additional sensors that may or may not otherwise be included on a standard vehicle with which the anomaly mitigation system 200 is implemented. In the illustrated example, sensors 252 include vehicle acceleration sensors 218, vehicle speed sensors 220, wheel-spin sensors 216 (e.g., one for each wheel), accelerometers such as a 2-axis accelerometer 222 to detect roll, pitch and yaw of the vehicle, environmental sensors 228 (e.g., to detect salinity or other environmental conditions), and proximity sensor 230 (e.g., sonar, radar, lidar or other vehicle proximity sensors). Additional sensors 232 can also be included as may be appropriate for a given implementation of anomaly mitigation system 200.

System 200 may be equipped with one or more image sensors 260. These may include front facing image sensors 264, side facing image sensors 266, and/or rear facing image sensors 268. Image sensors may capture information which may be used in detecting not only vehicle conditions but also detecting conditions external to the vehicle as well. Image sensors that might be used to detect external conditions can include, for example, cameras or other image sensors configured to capture data in the form of sequential image frames forming a video in the visible spectrum, near infrared (IR) spectrum, IR spectrum, ultra violet spectrum, etc. Image sensors 260 can be used to, for example, to detect objects in an environment surrounding a vehicle comprising anomaly mitigation system 200, for example, surrounding vehicles, roadway environment, road lanes, road curvature, obstacles, and so on. For example, a one or more image sensors 260 may capture images of surrounding vehicles in the surrounding environment. As another example, object detecting and recognition techniques may be used to detect objects and environmental conditions, such as, but not limited to, road conditions, surrounding vehicle behavior (e.g., driving behavior and the like), and the like. Additionally, sensors may estimate proximity between vehicles. For instance, the image sensors 260 may include cameras that may be used with and/or integrated with other proximity sensors 230 such as LIDAR sensors or any other sensors capable of capturing a distance. As used herein, a sensor set of a vehicle may refer to sensors 252.

Vehicle systems 258, for example, systems and subsystems 258 described above with reference to the example of FIG. 2, can include any of a number of different vehicle components or subsystems used to control or monitor various aspects of the vehicle and its performance. In this example, the vehicle systems 258 includes a vehicle positioning system 272; engine control circuits 276 to control the operation of engine (e.g. Internal combustion engine 124 and/or motors 122); object detection system 278 to perform image processing such as object recognition and detection on images from image sensors 260, proximity estimation, for example, from image sensors 260 and/or proximity sensors, etc. for use in other vehicle systems; vehicle display and interaction system 274 (e.g., vehicle audio system for broadcasting notifications over one or more vehicle speakers), vehicle display system and/or the vehicle dashboard system), and other vehicle systems 282 (e.g., Advanced Driver-Assistance Systems (ADAS), autonomous or semi-autonomous driving systems 280, such as forward/rear collision detection and warning systems, pedestrian detection systems, autonomous or semi-autonomous driving systems, and the like).

The vehicle positioning system 272 can include a global positioning system (GPS). Anomaly mitigation circuit 210 may be installed on a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

Network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network 290 may include one or more IEEE 802.11 wireless networks.

In some embodiments, the network 290 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 5G-V2X message; and a millimeter wave message, etc.

According to some embodiments, anomaly detection client 205 includes code and routines that are operable, when executed by a processor 206, to cause the processor 206 to collect data captured by captured from sensors 252 and/or vehicle system 258 (e.g., sensor data) and process the sensor data to detect an occurrence of anomalous driving behavior in a roadway environment; track the anomalous driving behavior; and generate anomaly data representative of the detected anomalous driving behavior. The anomaly data can be communicated to an edge/cloud server via communication circuit 201. The anomaly data may include digital data that describes anomalous driving behavior that was detected in a roadway environment surrounding anomaly mitigation circuit 210. In some embodiments, the anomaly data may include digital data describing a type of the anomaly, a location of the anomaly, a time when the anomaly occurs, or any other data related to the anomaly. In some embodiments, the anomaly data may be received from an external entity (e.g., a vehicle, a server, a RSU, etc.) that detects an occurrence of the anomaly.

For example, during operation, anomaly mitigation circuit 210 receives sensor data from various sensors 252 and/or vehicle systems 258 to detect anomalous driving behavior in a roadway environment. Communication circuit 201 can be used to transmit and receive information between anomaly mitigation circuit 210 and sensors 252, anomaly mitigation circuit 210 and image sensors 260, and anomaly mitigation circuit 210 and vehicle systems 258. Sensor data from sensors 252 and/or vehicle systems 258 is processed by anomaly detection client 205 to detect anomalous driving behavior. In some embodiments, image frames from image sensors 260 may be communicated to systems 258, which perform object recognition and detection techniques via object detection system 278 to detect the recognize and track anomalous driving behavior. For example, a rear facing image sensors 268 may capture images of an environment including a following vehicle exhibiting anomalous driving behavior as described above in connection with FIG. 1. By tracking movement patters of the following vehicle, the anomaly detection client 205 recognizes the anomalous driving behavior and generates anomaly data. The anomaly detection client 205 packages the anomaly data into a notification message and communicates the notification message to the edge/cloud server via communication circuit 201.

The anomaly mitigation client 207, according to various embodiments, includes code and routines that are operable, when executed by a processor 206, to cause the processor 206 to collect vehicle position data and/or current vehicle speed from sensors 252 and/or vehicle systems 258, which can be communicated to edge/cloud server via communication circuit 201.

For example, in some embodiments, the anomaly mitigation circuit 210 can communicate data to the edge/cloud server via wireless transceiver circuit 201. For example, anomaly mitigation client 207 can retrieve current vehicle speed data from vehicle speed sensors 220 and/or current geographic position data from other vehicle positioning system 272. The anomaly mitigation circuit 210 can then transmit the current vehicle speed data and/or current geographic position data to the edge/cloud server via communication circuit 201, either along with or separately from anomaly data. In some embodiments, raw sensor data can be transmitted to the edge/cloud server by anomaly mitigation circuit 210. For example, raw image data from image sensors 260 can be transmitted, which the edge/cloud server can utilize to detect anomalous driving behavior.

The anomaly mitigation client 207 can also be operated to receive target speed data communicated from the edge/cloud server via communication circuit 201. For example, the anomaly mitigation circuit 210 can receive a command message including target vehicle speed data from the edge/cloud server via communication circuit 201. The target vehicle speed data can be processed by anomaly mitigation client 207 and communicated to vehicle systems 258 via communication circuit 201. For example, the anomaly mitigation client 207 can transmit the target vehicle speed data to vehicle display and interaction system 274, which can notify the driver of the vehicle of the target speed. For example, the target speed can be displayed to the drive via a vehicle dashboard system of interaction system 274 to notify the driver of the target speed. In another example, the anomaly mitigation client 207 can transmit the target speed to an autonomous driving system (e.g., of other vehicle systems 282), which can then control engine control circuits 276 to adjust the vehicle speed according to the target vehicle speed. The anomaly mitigation client 207 can also operate to communicate target speed data to one or more vehicle systems 258 via wireless transceiver circuit 202 using V2V communication.

Figure 3:
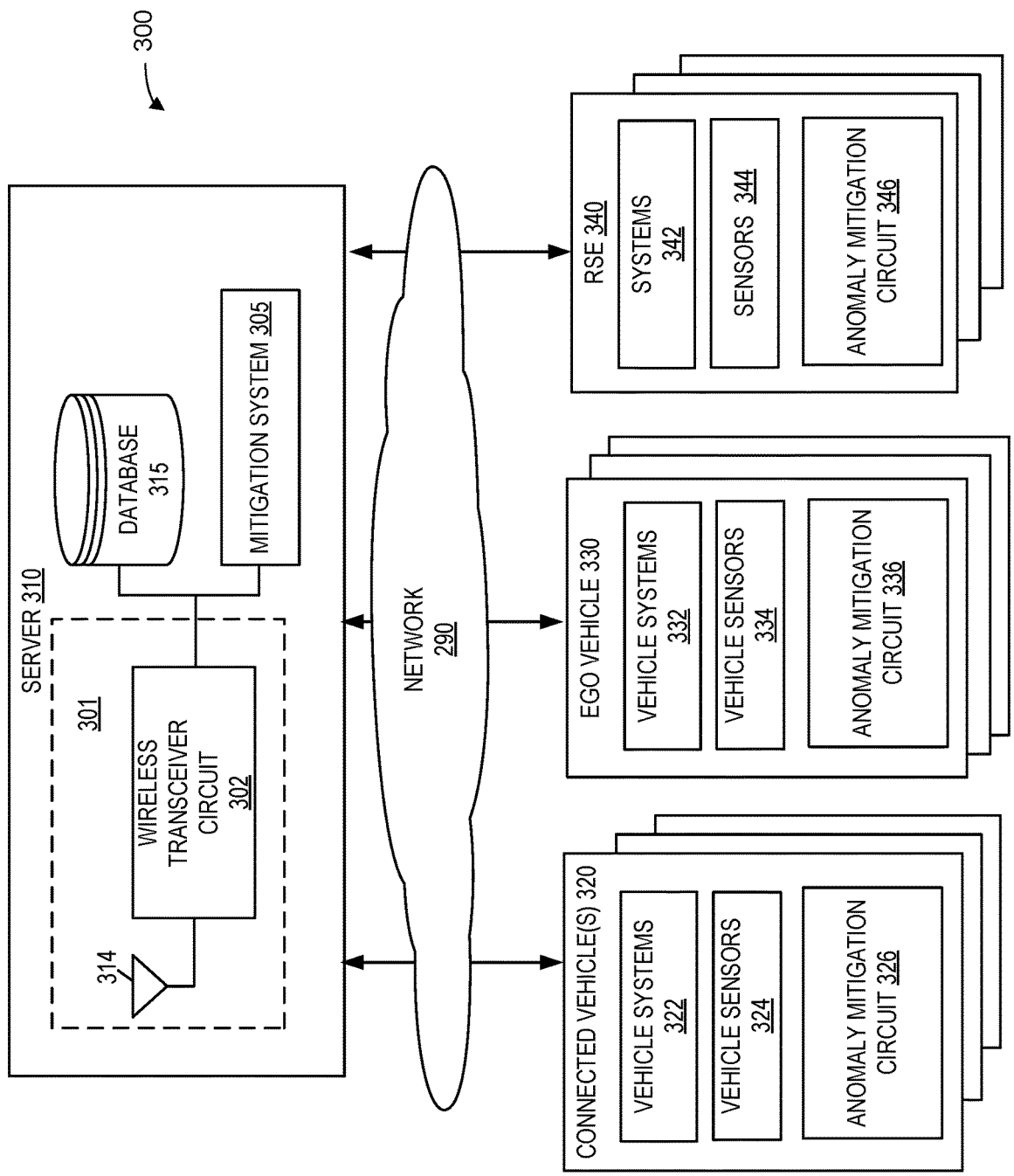
FIG. 3 is an example network architecture of an abnormal driving risk mitigation system in accordance with various embodiments disclosed herein.

FIG. 3 is an example network architecture 300 of an abnormal driving risk mitigation system in accordance with various embodiments disclosed herein. The architecture 300 includes a server 310 comprising a risk mitigation system 305, one or more connected vehicles 320 (collectively referred to as connected vehicles or vehicle 320), an ego vehicle 330, and one or more roadside equipment (RSE) 340 (one RSE is shown for illustrative purposes only). The server 310, connected vehicle 320, ego vehicle 330, and RSE 340 can all communicate with one another in this example, directly or through network 290. For example, connected vehicles 320 can communicate with the ego vehicle 330, and the ego vehicle 330 and/or connected vehicles 320 can communicate with the RSE 340.

Server 310 may be an edge server, a cloud server, or a combination of the foregoing. For example, server 310 may be an edge server implemented as a processor-based computing device installed in an RSE (e.g., RSE 340 or the like) and/or some other processor-based infrastructure component of a roadway. While a cloud server may be one or more cloud-based instances of processor-based computing device residents on network 290. Server 310 in this example includes a communication circuit 301 and risk mitigation system 305. The risk mitigation system 305 comprises code and routines that, when executed by a processor cause the processor to control various aspects of mitigating risk to connected vehicles 320 due to a detected occurrence of anomalous driving behavior as described herein. Server 310 may include, for example, a microcomputer that includes a one or more processing units (e.g., microprocessors), memory storage (e.g., RAM, ROM, etc.), and I/O devices. The server 310 may store information and data related to risk mitigation in a cloud-based database 315, which may be resident on network 290. The database 315 may include one or more various forms of memory or data storage (e.g., flash, RAM, etc.) that may be used to store suitable information, such as, one or more of the following elements: position data; vehicle speed data; influence region data; arrangement data; risk mitigation data; target speed data; and anomaly data, as described below, along with other data as needed The processing units of cloud server 310, execute instructions stored in memory to execute and control functions of the anomalous driving risk mitigation.

Communication circuit 301 includes either or both of a wireless transceiver circuit 302 with an associated antenna 314 and a wired I/O interface with an associated hardwired data port (not illustrated). Communication circuit 201 can provide for V2X communication capabilities, server 310 to communicate with connected devices, such as RSE, edge devices, and/or vehicles via network 290.

Ego vehicles 330 and connected vehicles 320 may each provide similar functionality, and as such ego vehicle may be considered a connected vehicle but for explanation purposes is referred to as the "ego vehicle." Ego vehicles 330 and connected vehicles 320 may be any type of vehicle, for example, but not limited to, a car; a truck; a sports utility vehicle; a bus; a semi-truck; a drone or any other roadway-based conveyance. Ego vehicles 330 and/or connected vehicles 320 may be implemented as vehicle 100 of FIG. 1. As such, ego vehicle 330 can comprises vehicle systems 332 and vehicle sensors 334 that are substantially similar to vehicle systems 258 and sensors 252 of FIG. 2. Ego vehicle 330 also includes anomaly mitigation circuit 336, which may be substantially similar to anomaly mitigation circuit 210 of FIG. 2. Similarly, connected vehicle 320 comprises vehicle systems 322 and vehicle sensors 324 that are substantially similar to vehicle systems 258 and sensors 252 of FIG. 2, along with anomaly mitigation circuit 326 that is substantially similar to anomaly mitigation circuit 210 of FIG. 2.

Ego vehicle 330 (and/or connected vehicle 320) may have V2X communication capabilities, allowing vehicles to communicate with edge devices, roadside infrastructure (e.g., such as RSE 340, which may be a vehicle-to-infrastructure (V2I)-enabled street light and/or cameras, for example). Vehicle 330 (or vehicles 320) may also communicate with other vehicles 320 over vehicle-to-vehicle (V2V) communications. It should be understood that sometimes, a vehicle itself may act as a network node, edge computing device, or a combination thereof. For example, vehicle 330 may operate as a network edge device. The data gathered by vehicles 330 (or vehicles 320), either through their own sensors, and/or other data sources, e.g., RSE 340 and other vehicles, may be ultimately be transmitted to the server 310. Furthermore, in some embodiments, a vehicle itself may act as a edge server.

The RSE 340 includes an anomaly mitigation circuit 346, systems 342, and sensors 344. The RSE 340 can be implemented, for example, as a computing component, such as computing component 900 of FIG. 9. The sensors 344 may be similar to sensors 252, for example, comprising environmental sensors 228 (e.g., to detect salinity and/or other environmental conditions), proximity sensor 230 (e.g., sonar, radar, lidar and/or other vehicle proximity sensors), and image sensors 260 the like for capturing data of an environment surrounding the RSE 340. Systems 342 may include, for example, object detection system 278 to perform image processing such as object recognition and detection on images from image sensors 260, proximity estimation, for example, from image sensors 260 and/or proximity sensors, etc. The anomaly mitigation circuit 346 includes code and routines that are operable, when executed, to cause the RSE 340 to perform similar functionality as described above in connection with anomaly detection client 205 based on sensor data collected by sensors 344 and/or systems 342. The anomaly mitigation circuit 346 may be operated to detect an occurrence of anomalous driving behavior and/or transmit sensor data to the server 310 for detection therefrom. The RSE 340 may also have known geographic coordinates and/or comprises a GPS unit of its own.

In various embodiments, the server 310 receives anomaly data packaged in a notification message, which notifies server 310 of an occurrence of anomalous driving behavior detected by ego vehicle 330 and/or RSE 340. The notification message may be transmitted to server 310 by the entity that detected the anomalous driving behavior. As described above, the anomaly data may include digital data describing a type of the anomaly, a location of the anomaly, a time when the anomaly occurs, a traveling direction of the anomaly, and/or any other data related to the anomaly. The anomaly data may be provided as time series data captured over a time period, which describes a recent movement pattern of the detected anomalous driving behavior.

The server 310 identifies nearby connected vehicles within a defined geographic area of the anomalous driving behavior indicated in the anomaly data. For example, from the anomaly data, the server 310 can compute a risk (or an impact) of the anomalous driving behavior (e.g., risk data) and determines an influence region around the anomalous driving behavior (e.g., influence region data). The influence region is a geographic region surrounding the anomalous driving behavior. For example, the influence region may be defined as a predetermined distance in front of, behind and to the sides of the ADR vehicle, or it may be defined as a predetermined radius around the ADR vehicle. In some embodiments, the lateral balance of the influence region may be all of the lanes on the roadway in the direction of travel of the ADR vehicle for a divided highway, and all of the lanes on the roadway in both directions of travel of the ADR vehicle for a highway and/or road that is not divided. An example implementation of determining influence region can be found in U.S. Pat. No. 11,380,198, the disclosure of which is incorporated herein by reference in its entirety.

From the geographic region, the server 310 identifies all vehicles within the influence region that are at risk of being affected by the detected anomalous driving behavior. For example, the server 310 identifies connected vehicles 320 and ego vehicle 330 as being at least partially within the influence region around the anomalous driving behavior (e.g., forward and/or adjacent of the anomalous driving behavior). For example, connected vehicle 320 and ego vehicle 330 may transmit current (e.g., most recent) vehicle position data (such as GPS data and/or other vehicle position data) to server 310, which the server 310 can use to confirm whether each vehicle is within the influence region. The identified vehicles may be included in the influence region data, for example, by registering a vehicle identification number (VIN) and/or other unique identifier associated with the identified vehicle in the influence region data.

In some embodiments, the server 310 can also generate predictive movement pattern data for the anomalous driving behavior. In an illustrative embodiment, recent movement patterns of the anomalous driving behavior included in the anomaly data may be applied to machine learning models trained in time series analysis to predict future movement patterns of the anomalous driving behavior. For example, connected vehicles 320 within the vicinity of the detected anomalous driving behavior may each transmit anomaly data to server 310, which accumulates the anomaly data into an aggregate time series anomaly data. The server 310 can then apply trained machine learning models on the aggregate time series anomaly data to infer future movement patterns unique to the anomalous driving behavior.

In another example, server 310 can generate predictive movement pattern data from historical movement patterns unique to the detected anomalous driving behavior. For example, the anomalous driving behavior may be exhibited by a connected vehicle 320 (referred to herein as ADR connected vehicle 320). From the anomaly data, server 310 can identify the ADR connected vehicle 320, obtain historical movement patterns unique the ADR connected vehicle 320, and infer future movement patterns for the ADR connected vehicle 320. The historical movement patterns may be stored in database 315 as a digital twin of the driver associated with the ADR vehicle 320 and accessible by server 310. For example, in some embodiments, the mitigation system 305 may include simulation software capable of simulating an execution of a digital twin simulation. A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is a replica of a real-world environment. The simulation software includes code and routines that are operable to execute simulations based on digital twins of real-world vehicles in the roadway environment. Digital twins, and an example process for generating and using digital twins which is implemented by the anomaly managing client and/or the anomaly managing system in some embodiments, are described in U.S. application Ser. No. 16/521,574, the disclosure of which is incorporated herein by reference in its entirety.

The predicted movement pattern data may be derived from inferences made using recent movement patterns unique to the anomalous driving behavior, historical movement patterns unique to the anomalous driving behavior, or a combination thereof.

Based on the predictive movement pattern data, the server 310 determines vehicular arrangement data configured to mitigate the risk (or impact) to the identified vehicles. Vehicular arrangement data comprises a path derived from the predictive movement pattern data so to mimics the predicted movement pattern unique to the anomalous driving behavior. Once the path is determined, the server 310 generates an arrangement comprising the path by distributing the identified vehicles in the influence region data to mitigated risk positions relative to the path, such that the path does not cross a mitigated risk positions. For example, from current (e.g., most recent) position data for each identified vehicle, the server 310 determines a mitigated risk position for each identified vehicle relative to the path and relative to the other identified vehicles. For example, the mitigated risk positions (also referred to herein as arrangement positions) can be determined as to form gaps between adjacent identified vehicles through which the path may traverse. A plurality of gaps are determined, each gap comprising a distance between adjacent vehicles. The gaps include a first subset of gaps having a distance between adjacent identified vehicles that is large (e.g., equal to or greater than a threshold distance) enough for the anomalous driving behavior to traverse the path without a colliding with the identified vehicles. The gaps also include a second subset of gaps having a distance that is less than the threshold distance. As a result, the path can pass through (e.g., cross through) the first subset of gaps, while the second subset of gaps and identified vehicles form borders of the path. The threshold distance for the gaps may be based on the ADR connected vehicle 320, for example, three vehicle lengths (however, other distances may be implemented as desired for a specific application). In various embodiments, the mitigated risk position of each vehicle maintains a lane configuration of the vehicle as indicated in the most recent position data (e.g., prior to detection of the anomalous driving behavior). That is, the mitigated risk position maintains the most recent lane position of each respective vehicle. The determined arrangement of the identified vehicles is stored as the vehicular arrangement data.

The server 310 then determines risk mitigation data for each of the identified vehicles from the vehicular arrangement data, most recent position data obtained from each identified vehicle, and vehicle speed data obtained from each identified vehicle. For example, risk mitigation data for each identified vehicle comprises a target speed determined so to arrange the respective vehicle into the determined arrangement. For example, server 310 uses the current vehicle speeds and the current positions of the vehicles, to determine speeds that would result in each vehicle being guided to a respective position relative to the other identified vehicles, thereby resulting in the determined arrangement.

The server 310 then packages the risk mitigation data into a command message, which is transmitted to each identified vehicle via communication circuit 301 over network 290. As described above, the anomaly mitigation circuit 336 and/or anomaly mitigation circuit 326 of each identified vehicle receives the command message and transmits the command message to systems 332 and/or 322, respectively.

Figure 4:
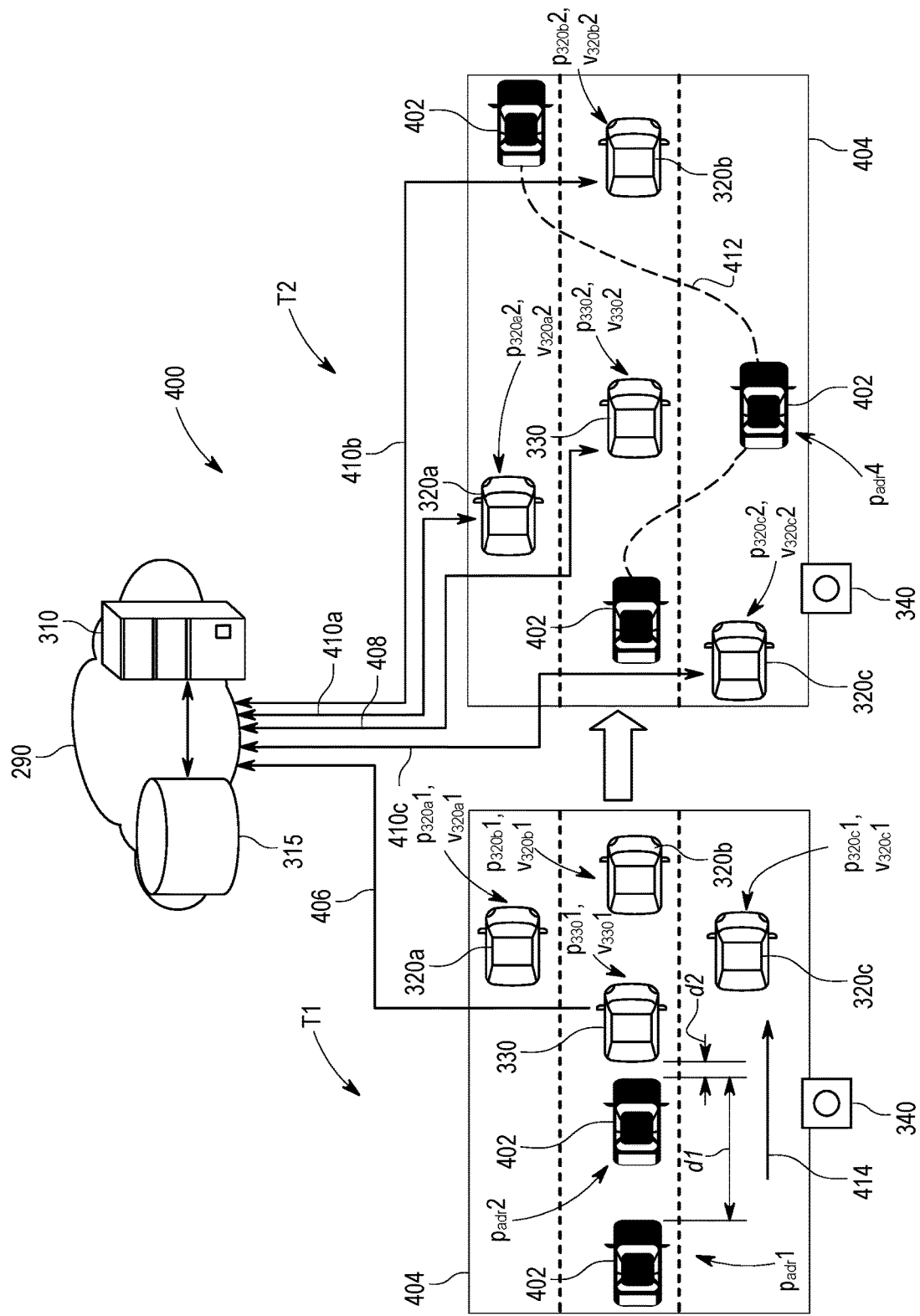
FIG. 4 is a schematic diagram illustrating an example of mitigating risk due to an occurrence of anomalous driving behavior in accordance with various embodiments disclosed herein.

FIG. 4 is a schematic diagram illustrating an example of mitigating risk due to an occurrence of anomalous driving behavior in accordance with various embodiments disclosed herein. FIG. 4 illustrates an example roadway environment 400, in which ego vehicle 330 and connected vehicles 320a through 320c (collectively referred to herein as connected vehicles 320) are traveling along a section of roadway 404 in a traveling direction 414. Ego vehicle 330 and connected vehicles 320 are described above in connection with FIGS. 1-3. Roadway environment 400 also includes server 310 and cloud-based database 315 as described above, with which the ego vehicle 330 and connected vehicle 320 are connected to via V2X communication over network 290. Roadway environment 400 also includes a vehicle 402 which is exhibiting anomalous driving behavior (referred to herein as ADR vehicle 402) and a RSE 340. The ADR vehicle 402 is also generally traveling in the traveling direction 414, but for lane changes, swerving, and/or weaving maneuvers.

FIG. 4 depicts the roadway environment 400 at two time periods, T1 and T2. During first time period T1, the ego vehicle 330 and/or the RSE 340 detects the anomalous driving behavior of the ADR vehicle 402 and notifies the server 310 of the detected occurrence of anomalous driving behavior via notification message 406. Notification message 406 comprises anomaly data, as described above, describing the detected anomalous driving behavior. During the second time period T2, the server 310 transmits command message 408 to ego vehicle 330 and command messages 410a-410c (collectively referred to herein as command messages 410) to connected vehicle 320a-320c, respectively. Command messages 408 and 410 include risk mitigation data, as described above, which ego vehicle 330 and connected vehicle 320 can utilize to distribute themselves into an arrangement determined by server 310, as shown in the time period T2 of FIG. 4. The determined arrangement comprises path 412, such that ADR vehicle 402 can weave through ego vehicle 330 and connected vehicle 320 based on gaps between adjacent ego vehicle 330 and/or connected vehicles 320.

Figure 5:
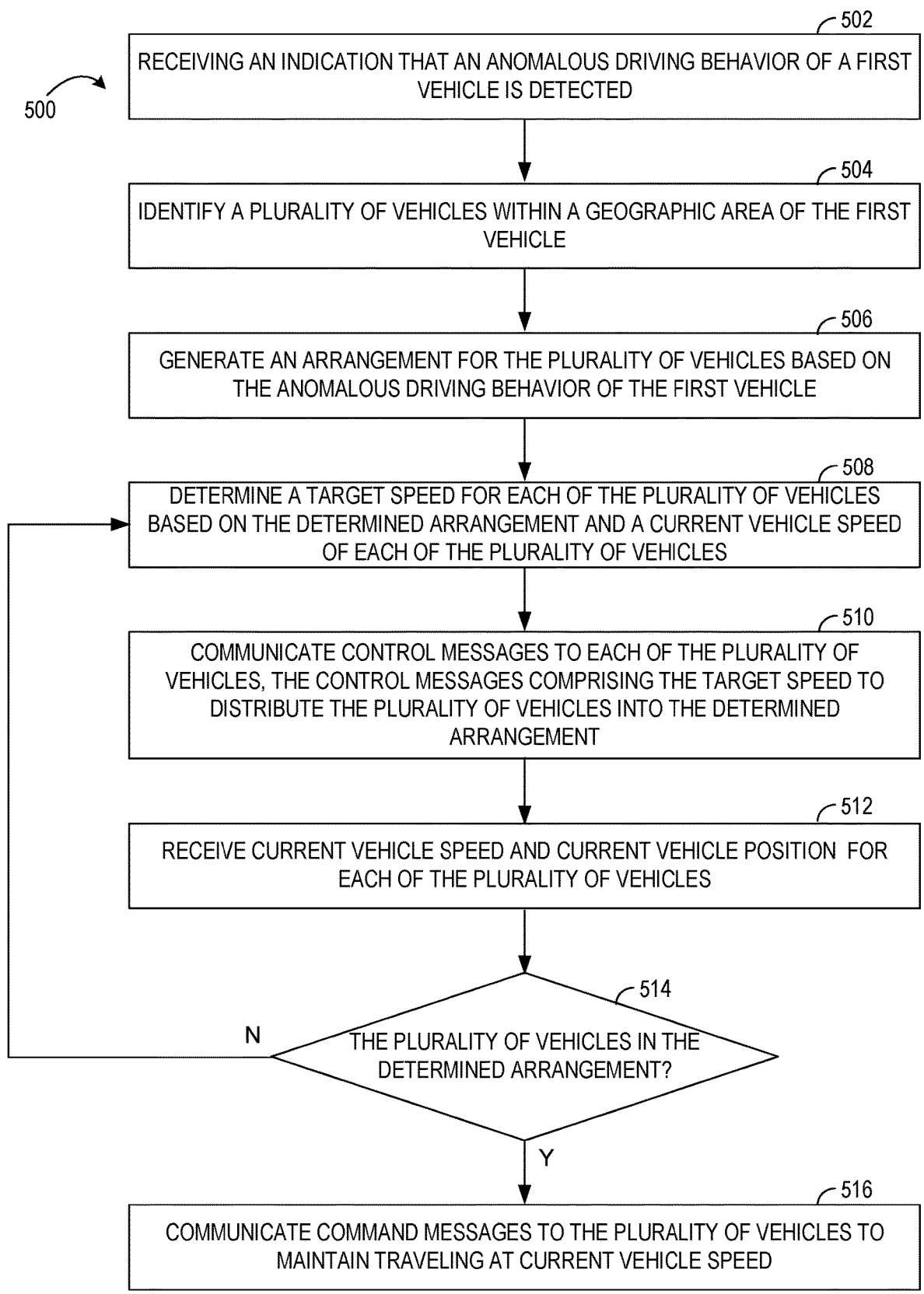
FIG. 5 is a flow chart illustrating example operations for mitigating risk due to an occurrence of anomalous driving behavior in accordance with various embodiments disclosed herein.

FIG. 5 is a flow chart illustrating example operations for mitigating risk due to an occurrence of anomalous driving behavior in accordance with various embodiments disclosed herein. FIG. 5 illustrates a process 500 that may be implemented as instructions, for example, stored on server 310, that when executed by one or more processors perform the operations of process 500. The process 500 will be described hereinafter in the context of the roadway environment 400 of FIG. 4.

At block 502, an indication that an occurrence of anomalous driving behavior exhibited by ADR vehicle 402 has been detected is received. For example, as described above, ego vehicle 330 comprises vehicle sensors 334. For example, ego vehicle 330 may have proximity and/or image sensors that can detect nearby objects and/or other vehicles, gather data pertaining to the nearby objects and/or other vehicles, etc. The anomaly mitigation circuit 336 of ego vehicle 330 can collect sensor data from vehicle sensors 334, from which movement patterns of ADR vehicle 402 can be recognized and used to detect anomalous driving behavior. As another example, ADR vehicle 402 may also include various vehicle sensors and the sensors can be used to detect anomalous driving behavior of the ADR vehicle 402 itself. For example, sensors on ADR vehicle 402 to detect things like steering angle, throttle position, braking input, proximity to other vehicles, and so on, can be used to detect anomalous driving behavior of ADR vehicle 402.

FIG. 4 illustrates a typical scenario of aggressive driving behavior detected from a movement pattern characterized by rapid fluctuations in following distance between ADR vehicle 402 and ego vehicle 330. For example, during time period T1, ADR vehicle 402 approaches ego vehicle 330 along traveling direction 414 at a high speed (e.g., at least above the legal speed limit, and more particularly at a speed that is higher than one or more of ego vehicle 330 and/or connected vehicle 320). At a position $p_{adr}1$, ADR vehicle 402 is a at distance d1 from ego vehicle 330 and at a position $p_{adr}2$ ADR vehicle 402 is at a distance d2 from ego vehicle 330, which is shorter than distance d1. In the example scenario, the distance d2 may be less than a safe traveling distance from ego vehicle 330, for example, less than a 3-second following distance (e.g., the "three-second rule" which is a distance traveled within three seconds at the traveling speed).

Sensor data used to detect the anomalous driving behavior can be captured by one or more of the vehicle sensors 334 and/or vehicle systems 332 of ego vehicle ego vehicle 330. In some embodiments, sensors 344 and/or systems 342 of RSE 340 can be used to capture sensor data from which the anomalous driving behavior can be detected. In either case, anomalous behavior can be detected by tracking movement patterns included in the sensor data. For example, from the sensor data, object recognition and time series analysis can be executed to detect patterns indicative of the anomalous driving behavior, such as, when ADR vehicle 402 approaches the rear of vehicle 330 at high speed, reaches position $p_{adr}2$, exhibits hard braking to return to position $p_{adr}1$, then accelerates to position $p_{adr}2$ again, and repeats this pattern of acceleration and brake a number of times. As another example, alone or in combination with the above, the sensor data can be used to detect repeated swerving of ADR vehicle 402 within the lane behind ego vehicle 330 (e.g., from one side to another side of a lane). Additional examples and parameters for detecting anomalous driving behavior is described in U.S. Pat. No. 11,414,088; U.S. application Ser. No. 17/005,258; and U.S. application Ser. No. 17/578,677, the disclosures of which are each incorporated herein by reference in its entirety. Upon detecting the anomalous driving behavior of ADR vehicle 402, the ego vehicle 330 (or RSE 340) generates anomaly data and packages the anomaly data into a notification message 406. The entity that detected the anomalous driving behavior (e.g., ego vehicle 330 and/or RSE 340) transmits the notification message 406 to server 310, thereby notifying server 310 of the detected behavior.

In some embodiments, server 310 may receive anomaly data from ego vehicle 330 and/or RSE 340 and detect anomalous driving behavior from the received anomaly data. In this case, notification of the anomalous driving behavior occurs upon detecting the anomalous driving behavior, opposed to upon receipt of the notification message 406.

In some embodiments, in either of the above cases, responsive to the receiving the indication of detected anomalous driving behavior of the first vehicle, the server 310 can predict a movement pattern for the ADR vehicle 402. For example, the server 310 can generate predictive movement pattern data for the ADR vehicle 402 from current and/or historical movement patterns data unique to ADR vehicle 402. As described above, in relation to FIG. 3, from the anomaly data, server 310 can identify the ADR vehicle 402, obtain historical movement patterns unique the ADR vehicle 402 from cloud-based database 315, and infer future movement patterns therefrom. Further, either alone or in combination with the historical movement pattern data, recent movement pattern data of the anomalous driving behavior, included in the anomaly data, may be applied to machine learning models to predict future movement patterns for the ADR vehicle 402, as described above.

For example, server 310 and/or ego vehicle ego vehicle 330 can collect driving data of the ADR vehicle 402 (e.g., within a time period) and label such data as normal driving behavior or anomalous driving behavior. Server 310 and/or ego vehicle 330 can be configured to mine the labeled data and infer movement patterns unique to labeled data. For example, server 310 and/or ego vehicle 330 may compare the data labeled as normal driving behavior to data labeled as anomalous driving behavior and locate where these two driving behaviors contradict one another. At these contradiction point the data labeled as anomalous driving behavior may be the predicted movement pattern, which is recorded to cloud-based database 315 and/or on the ego vehicle 330.

Returning to process 500, at block 504 a plurality of vehicles within a geographic area of the detected anomalous driving behavior are identified. For example, server 310 can identify one or more nearby connected vehicles 320 and/or ego vehicle 330 within a vicinity of the detected anomalous driving behavior (e.g., a defined geographical area of the ADR vehicle 402). For example, using the anomaly data, the server 310 can compute a risk (or an impact) of the anomalous driving behavior (e.g., risk data) imparted to vehicles in the surrounding environment and determine an influence region around (e.g., forward of the ADR vehicle 402 and/or adjacent thereto) the anomalous driving behavior (e.g., influence region data), which is a geographic area surrounding the ADR vehicle 402 and includes all connected vehicles 320 that are at risk of being affected by the detected anomalous driving behavior. In some embodiments, a risk index may be determined based on static thresholding. For example, a risk index is attributed to vehicles in an environment is decreased for every "X" meters from an anomalous behavior. In an example implementation, "X" may be 100 meters, however other distances may be used as desired. If a vehicle is close to ADR vehicle 402 (e.g., within 100 meters), the vehicle is under a high risk and the risk index is at a maximum. Here we can come up with something like this. Based on the detected anomalous driving behavior and the current traffic (e.g., how many vehicles within a distance around the ADR vehicle 402 and road type) a dynamic risk can be derived. Further, based on a predicted movement pattern, the risk index can be adjusted. From the risk indices for each vehicle, an influence region can be determined. An example implementation of determining risk and influence region can be found in U.S. Pat. No. 11,380,198, the disclosure of which is incorporated herein by reference in its entirety.

The identified vehicles 320/320 are those vehicles within the surrounding environment that are within the determined influence region. In some embodiments the identified vehicles 330/320 can correspond to those vehicles within the influence area that are forward of ADR vehicle 402 along the traveling direction 414 and/or adjacent (e.g., to the right and/or left) thereto.

At block 506, an arrangement for the vehicles identified at block 508 is generated based on the detected anomalous behavior of the ADR vehicle 402. For example, server 310 determines one or more paths 412 (e.g., path data) based on the detected anomalous driving behavior of the ADR vehicle 402. The server than calculates a mitigated risk position for each identified vehicle 330/320, such that the identified vehicles 330/320 are distributed within the roadway environment 400 forming the path 412. For example, server 310 may receive current position data for each identified vehicle 330/320 during time period T1 (e.g., positions $p_{330}1$, $p_{320a}1$, $p_{320b}1$, and $p_{320c}1$). The server 310 then calculates mitigated risk positions $p_{330}2$, $p_{320a}2$, $p_{320b}2$, and $p_{320c}2$ based on the path 412 and stores the mitigated risk positions in a data structure the vehicular arrangement data. In some embodiments, server 310 derives the one or more paths 412 from the predictive movement pattern data for ADR vehicle 402 so to mimic the predicted movement pattern for ADR vehicle 402. Providing a path 412 that mimics and/or otherwise is based on the predicted movement pattern increases the likelihood that ADR vehicle 402 will actually utilize path 412 within the real-world roadway environment (e.g., roadway environment 400).

In some embodiments, mitigated risk positions are determined based on a calculating a gap between adjacent identified vehicles 330/320 so to form path 412. The gaps may be sized such that the gaps collectively form path 412. For example, a gap size for each of a first subset of gaps, through which path 412 passes (e.g., crosses through) can be set as a distance between adjacent identified vehicles that is large enough (e.g., equal to or larger than a threshold distance) for the ADR vehicle 402 to traverse the path 412 without a colliding with an identified vehicle 330/320. Further, a gap size of each of a second subset of gaps is determined to be too small for the ADR vehicle 402 to traverse (e.g., less than the threshold distance). Thus, path 412 is formed so to pass through the first subset of gaps, while the second subset of gaps form borders of path 412. For example, the identified vehicles 330/320 and the second subset of gaps can collectively form borders of the path 412. The threshold distance may be based on the length of ADR vehicle 402, for example, three vehicle lengths (however, other distances may be implemented as desired for a specific application). By providing gaps that are at least equal to the threshold distance, the ADR vehicle 402 can be enticed to utilize the first subset of gaps in passing, instead of trying to squeeze through smaller gaps of the second subset. Therefore, the ADR vehicle 402 can be enticed into following path 412 through the arrangement.

In various embodiments, the mitigated risk position for each identified vehicle maintains a current lane configuration as indicated in the most recent position data. That is, the mitigated risk position maintains the most recent lane position of each respective identified vehicle, from prior to detecting the anomalous driving behavior. For example, as shown in FIG. 4, a time period T2 (e.g., when the determined arrangement is implemented in the real-world roadway environment 400) mitigated risk positions $p_{330}2$, $p_{320a}2$, $p_{320b}2$, and $p_{320c}2$ are kept in the same lane as positions $p_{330}1$, $p_{320a}1$, $p_{320b}1$, and $p_{320c}1$ during time T1.

Again referring back to FIG. 5, at block 508, risk mitigation data is determined for each of the identified vehicles based on the determined arrangement and a current speed of each of the identified vehicles. According to various embodiments disclosed herein, risk mitigation data comprises target speed data derived from the vehicular arrangement data and current vehicle speed data for each of identified vehicles 330/320. For example, server 310 can receive vehicle speed data from each of the identified vehicles 330/320 during time period T1 that includes a current and/or most recent vehicle speed. The target speed data for each identified vehicles 330/320 can be a vehicle speed selected so to guide the respective vehicle into its respective mitigated risk position, relative to the other identified vehicles 330/320, determined during block 506. Furthermore, the target speed data for a given identified vehicle can be based on the current vehicle speed of the given identified vehicle, the current vehicle speeds of the other identified vehicles, and each of the mitigated risk positions. For example, server 310 may determine, as part of the determined arrangement, that each identified vehicle 330/320 should be at a second position relative to the other identified vehicles 330/320 (as shown during time period T2 of FIG. 4). The server 310 checks the current vehicle speed of each identified vehicle 330/320, and determines a target speed (either an increase or decrease in speed) that will guide each identified vehicle 330/320 to the desired position relative to other identified vehicles 330/320.

In the illustrative example of FIG. 4, during time period T1, ego vehicle 330 is traveling at a vehicle speed $v_{330}1$ and connected vehicles 320a, 320b and 320c are traveling at $v_{320a}1$, $v_{320b}1$ and $v_{320c}1$ respectively. Assume that $v_{330}1$, $v_{320a}1$, $v_{320b}1$ and $v_{320c}1$ are approximately the same for this example. Thus, ego vehicle 330 and connected vehicles 320a, 320b and 320c are arranged as shown in FIG. 4 during time period T1. Server 310 determines mitigated risk positions $p_{330}2$, $p_{320a}2$, $p_{320b}2$, and $p_{320}2$ for each vehicle. In the case of ego vehicle 330, server 310 may determine that $p_{330}2$ is forward of $p_{330}1$, with respect to the connected vehicles 320a, 320b and 320c at time period T1. Thus, to guide ego vehicle 330 to $p_{330}2$, the server 310 determines a target speed for ego vehicle 330 during time period T2 that increases the vehicle speed of ego vehicle 330 from v 3301. As shown in FIG. 4, $p_{320a}2$ may be similar to $p_{320a}1$, at least relative to ego vehicle 330 the (e.g., relative placement is unchanged). As such, the target speed can be determined that $v_{320a}2$ is the same as $v_{320a}1$. For connected vehicle 320c, $v_{320c}2$ may be less than $v_{320c}1$ such that connected vehicle 320c moves to position $p_{320c}2$. For connected vehicle 320b, $v_{320b}2$ may be determined to increase the vehicle speed relative to $v_{320b}1$, which may be larger than $v_{330}2$ so to create the increased space between connected vehicle 320b and ego vehicle 330.

The server 310 packages the risk mitigation data into command messages, which are communicated to each of the identified vehicles at block 510. For example, server 310 transmits command messages 408 and 410 to each identified vehicle 330/320 over network 290 using V2X communication.

The identified vehicles 330/320 receive the respective command messages, unpackages the risk mitigation data, and a respective anomaly mitigation circuit supplies the risk mitigation data to one or more vehicles systems (e.g., vehicle systems 332 and/or vehicle sensors 334). In some embodiments, target speed data can be communicated to a display and interaction system of a respective vehicle, which notifies the drive of the target speed (e.g., displays the target speed and/or instruct the driver to increase/decrease speed). The drivers may then operate the vehicle according to the target speed so to guide the vehicle to the determined mitigated risk position. Alternatively, or in combination, autonomous and/or semi-autonomous driving systems may receive the target speed data and operate the vehicle according to the target speed.

At block 512, current vehicle speed data and current position data, for each identified vehicle 330/320, can be received. For example, after receiving command messages 408 and 410 at block 510, identified vehicles 330/320 transmit updated current vehicle speeds and position data to server 310. From the updated position data, at block 514, the process 500 determines if the identified vehicles 330/320 are in the arrangement determined at block 506. For example, server 310 checks whether the updated position data matches the mitigated risk positions of the arrangement data. If not, process 500 proceeds to block 508 and repeats blocks 508 through 514. If the determination at block 514 is Yes, the process 500 proceeds to block 516, at which point command messages 408 and 410 are communicated to the identified vehicles 330/320 including target speeds that maintain current traveling speeds and, therefore, maintain the arrangement determined at block 506.

Once the vehicles are arranged (e.g., as shown at time period T2 in FIG. 1), the ADR vehicle 402 can execute a weaving maneuver by generally following path 412 that mitigates risk to the identified vehicles 330/320 due to the weaving maneuver. For example, the weaving maneuver of path 412 includes cutting in front of connected vehicle 320c, due to a blocking gap (e.g., one of second subset of gaps) provided by ego vehicle 330 and connected vehicle 320a and a passing gap (e.g., one of the first subset of gaps) between ego vehicle 330 and connected vehicle 320c. The weaving maneuver of path 412 then passes ego vehicle 330 at position $p_{adr}4$ in a right side lane (e.g., right side of traveling direction), crosses the middle lane, and passes connected vehicle 320b on the left side lane, due to a passing gap formed between ego vehicle 330 and connected vehicle 320b. The server 310 may track the relative positions of identified vehicles 330/320, confirm if identified vehicles 330/320 are in the determined arrangement, and maintain current vehicle speeds until the ADR vehicle 402 has passed the platoon (or group) of identified vehicles 330/320.

As shown in FIG. 4, the ADR vehicle 402 is permitted to continue with anomalous driving behavior (e.g., weaving along path 412), while risk of collision with ego vehicle 330 and/or connected vehicles 320 is mitigated due to the determined arrangement that permits the ADR vehicle 402 to pass. Furthermore, since vehicle speeds are controlled so as to maintain the gaps spacing, evasive maneuvers from ego vehicle 330 and connected vehicles 320 are not necessary. Furthermore, by forming the arrangement as set forth above, lane configurations can be maintained and the anomalous driving behavior is not propagated to other vehicles, thereby reducing and/or minimizing occurrence of collisions under exposure to anomalous driving behavior.

Although one ego vehicle 330, three connected vehicles 320, one ADR vehicle 402, one RSE 340, one server 310 and one network 290 are depicted in FIG. 4, in practice the environment 400 may include any number of ego vehicle 330, connected vehicles 320, RSUs 340, servers 310 and networks 290.

Figure 6:
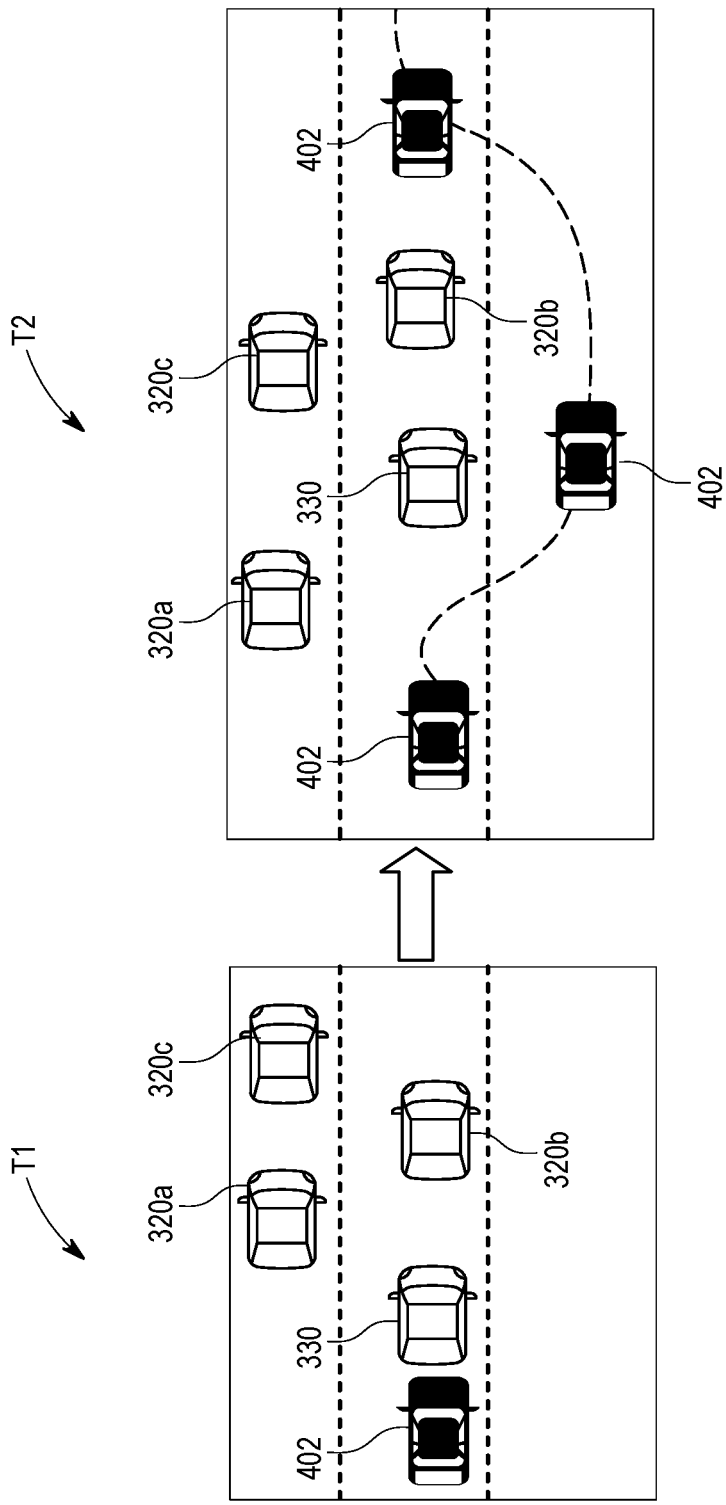
FIG. 6 is a schematic diagram illustrating another example of mitigating risk due to an occurrence of anomalous driving behavior in accordance with various embodiments disclosed herein.

In some embodiments, the arrangement determined at block 506 may a platoon (or grouping) of the identified vehicles 330/320 such that path 412 passes around the entire platoon. For example, as shown by FIG. 6, which depicts a roadway environment at time period T1 similar to FIG. 4, in which an occurrence of anomalous driving behavior is detected, and at time period T2, in which the identified vehicles 330/320 are arranged into a platoon so that ADR vehicle 402 can pass around the platoon.

Figure 7:
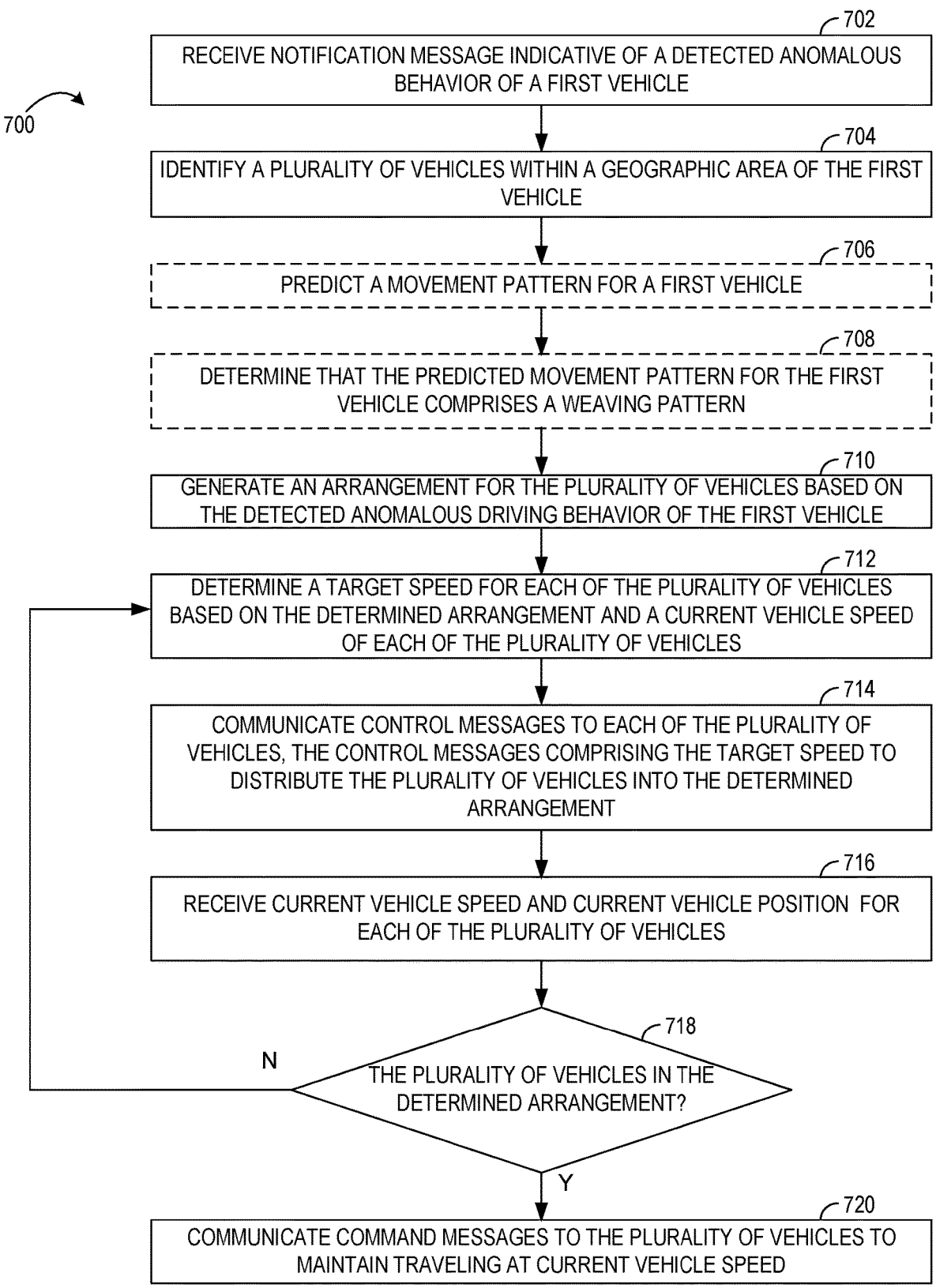
FIG. 7 is a flow chart illustrating another example of operations for mitigating risk due to an occurrence of anomalous driving behavior in accordance with various embodiments disclosed herein

FIG. 7 is a flow chart illustrating another example of operations for mitigating risk due to an occurrence of anomalous driving behavior in accordance with various embodiments disclosed herein. FIG. 7 illustrates a process 700 that may be implemented as instructions, for example, stored on server 310, that when executed by one or more processors perform the operations of process 700. The process 700 will be described hereinafter in the context of the roadway environment 400 of FIG. 4.

At block 702, a notification message is received at the server indicative of a detected anomalous driving behavior. For example, as described in connection with block 502 of FIG. 5, ego vehicle 330, RSE 340, and/or server 310 may detect anomalous driving behavior exhibited by ADR vehicle 402 and transmit notification message 406 to server 310.

At block 704, a plurality of vehicles within a geographic region of the anomalous driving behavior are identified by the server. For example, as described above in connection with block 504, server 310 can identify one or more nearby connected vehicle 320 and/or ego vehicle 330 within a vicinity of the detected anomalous driving behavior (e.g., an influence region of the ADR vehicle 402).

At optional block 706 (e.g., as indicated by a dashed line), a movement pattern for ADR vehicle 402 can be predicted by the server. For example, as described in connection with block 502 of FIG. 5, future movement patterns can be predicted for ADR vehicle 402 from current and/or historical movement patterns unique to the ADR vehicle 402.

At optional block 708 (e.g., as indicated by a dashed line), the server determines whether or not the predicted movement pattern from block 706 comprises a weaving pattern. For example, from the predictive movement pattern data, server 310 can predict that a movement pattern unique to the ADR vehicle 402 comprises executing a weaving pattern after performing rapid distance fluctuations and/or swerving maneuvers within a lane behind ego vehicle 330. If the predicted movement pattern comprises a weaving pattern, then the determination is affirmative and the process proceeds to block 710. If the determination at block 708 is negative (e.g., ADR vehicle 402 is likely to stay behind ego vehicle 330 and maintain current movement pattern), then the process ends. In some embodiments, the process may proceed to an alternative form of risk mitigation, for example, through instructing evasive maneuvering of one or more identified vehicles 330/320 to permit ADR vehicle 402 to pass.

At block 710, an arrangement for the vehicles identified at block 704 is determined by the server based on detected anomalous behavior of the ADR vehicle 402. For example, block 710 can be executed in a manner described in connection with block 506 of FIG. 5. In embodiments comprising execution of blocks 706 and 708, in response to the determination that the predicted movement pattern is indicative of a weaving pattern, the arrangement for the vehicles identified at block 704 can be determined by the server based on the predicted movement pattern for the ADR vehicle 402.

At block 712, risk mitigation data is determined by the server for each of the identified vehicles based on the determined arrangement and a current speed of each of the identified vehicles. For example, block 712 can be executed in a manner described in connection with block 508 of FIG. 5.

At block 714, command messages are communicated, by the server, to each of the identified vehicles including the risk mitigation data. For example, block 714 can be executed in a manner described in connection with block 510 of FIG. 5.

At block 716, current vehicle speed data and current position data, for each identified vehicle 330/320, are received at the server. From the recent position data, at block 716, the process 700 determines if the identified vehicles 330/320 are in the determined arrangement at block 718. If not, process 700 proceeds to block 712 and repeats the process. If the determination at block 718 is Yes, the process 700 proceeds to block 720, at which command messages 408 and 410 are communicated to the identified vehicles 330/320 that instruct the identified vehicles 330/320 to maintain current traveling speeds. Thereby, maintaining the determined arrangement. For example, blocks 716-720 can be executed in a manner described in connection with blocks 512-516 of FIG. 5.

In some embodiments, a vehicular micro cloud (e.g., peer-to-peer group) can be formed between the ego vehicle 330 and connected vehicles 320 to collaboratively perform risk mitigation due to anomalous driving behavior. Vehicular micro cloud formation generally involves connected vehicles that are close by one another forming a micro cloud, where the connected vehicles are referred to as "micro cloud members." Generally, a micro cloud leader establishes a vehicular micro cloud for a geographic area in which the micro cloud leader is located and connected vehicles collaboratively perform computation, data storage, sensing, communication tasks and any combination thereof among the micro cloud members over Vehicle-to-Everything (V2X) networks, such as V2V networks. Results of the collaboration are shared by the micro cloud leader. Example operational tasks include, but are not limited to: (1) collaboratively performing resource-intensive computational tasks among the micro cloud members; (2) collaboratively keeping and updating data content among the micro cloud members; (3) collaboratively performing sensing of road conditions by on-board sensors of the micro cloud members; and (4) collaboratively downloading and/or uploading data content from and/or to a cloud server (or an edge server). Additional details regarding vehicular micro clouds can be found in, for example, U.S. Pat. No. 11,395,118; U.S. application Ser. No. 15/358,567; U.S. application Ser. No. 15/799,442; U.S. application Ser. No. 15/845,945; and U.S. application Ser. No. 15/799,963, each of which are incorporated herein by reference in its entirety.

Using vehicular micro clouds can remove the need for the connected vehicles to consistently access remote cloud servers or edge servers by leveraging vehicle-to-network (V2N) communications (e.g., by cellular networks) whenever the connected vehicles need access to data (e.g., high-definition road map for automated driving). Depending on a mobility of the vehicular micro clouds, the vehicular micro clouds can be categorized into two types by way of examples: a stationary vehicular micro cloud and a mobile vehicular micro cloud.

A mobile vehicular micro cloud can be tied to a certain connected vehicle that initiated formation of the vehicular micro cloud by inviting nearby vehicles (either directly or indirectly via an edge/cloud server) to join the mobile vehicular micro cloud. A micro cloud leader (e.g., the member vehicle acting as the micro cloud leader) establishes or forms the mobile vehicular micro cloud for a geographic location by forming the micro cloud for a defined area surrounding the micro cloud leader. Unlike a stationary vehicular micro cloud, the mobile vehicular micro cloud moves with the micro cloud leader as the micro cloud leader travels. The micro cloud leader recruits other micro cloud members to join the mobile vehicular micro cloud and distributes sub-tasks to the other micro cloud members for collaborative task execution. The micro cloud leader also dismisses micro cloud members that exit the mobile vehicular micro cloud, either due to movement of the micro cloud leader and/or movement of the dismissed micro cloud members. When exiting from vehicular micro cloud, the dismissed vehicle may hand over on-going tasks and data of the vehicular micro cloud to micro cloud members, including the micro cloud leader. In some implementations, designation as micro cloud leader may be handed over to another micro cloud member, for example, in a case where the micro cloud leader exits the geographic area of the vehicular micro cloud.

Figure 8:
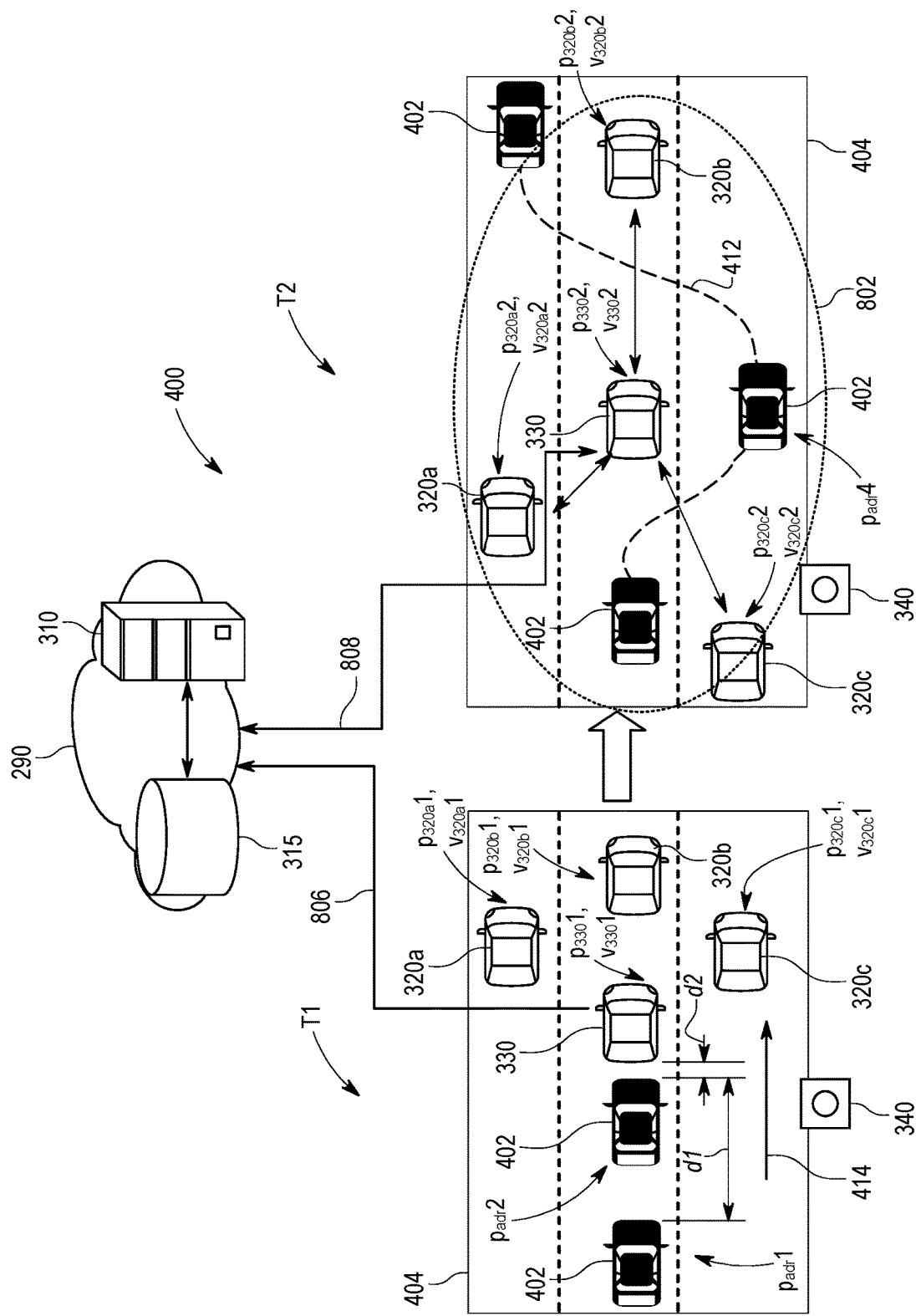
FIG. 8 is a schematic diagram illustrating an example of mitigating risk due to an occurrence of anomalous driving behavior through the use of a vehicular micro cloud in accordance an embodiment disclosed herein.

FIG. 8 is a schematic diagram illustrating an example of mitigating risk due to an occurrence of anomalous driving behavior through the use of a vehicular micro cloud in accordance an embodiment disclosed herein. FIG. 8 is substantially similar to FIG. 4, except as provided herein. As such, FIG. 8 illustrates a roadway environment 400, in which ego vehicle 330 and connected vehicles 320*a* through 320*c* are traveling along a section of roadway 404, as described in connection with FIG. 4. Furthermore, roadway environment 400 also includes server 310 and cloud-based database 315 as described above and ADR vehicle 402.

During first time period T1, the ego vehicle 330 (or RSE 340) detects the anomalous driving behavior of the ADR vehicle 402 and notifies the server 310 of the detected occurrence of anomalous driving behavior via notification message 806. Similar to notification message 406 of FIG. 4, notification message 806 comprises anomaly data, as described above, describing the detected anomalous driving behavior occurrence. Additionally, notification message 806 includes a request to form a vehicular micro cloud with nearby connected vehicles 320.

Based on notification message 806, the server 310 performs operations such as those described in connection FIGS. 5 and 7. For example, the server 310 identifies vehicles 330/320 within the influence region that are at risk due to the anomalous driving behavior of ADR vehicle 402. The identifiers of the identified vehicles 330/320 are provided to ego vehicle 330, which ego vehicle 330 uses to invite connected vehicles 320 to join the vehicular micro cloud 802. For example, command message 808 may include the identifiers of identified vehicles 330/320. Ego vehicle 330 is designated as the micro cloud leader for the vehicular micro cloud 802 and the connected vehicles 320 are designated as micro cloud members.

During the second time period T2, the server 310 transmits command message 808 to ego vehicle 330. Command message 808 includes risk mitigation data, as described above, for ego vehicle 330. In some embodiments, command message 808 can include risk mitigation data for the micro cloud members, which ego vehicle 330 can communicate to the micro cloud members. Through collaborative communications between the micro cloud members, the identified vehicles 330/320 can collaboratively guide themselves/each other to the mitigated risk positions. For example, ego vehicle 330 may act in a similar manner to server 310 so to communicate target speed data, receive updated position and vehicle speed data, and communicate updated target speed data to ensure the identified vehicles are guided to positions according to the determined arrangement. In another example, server 310 may transmit initial command messages 410, as described in connection to FIG. 4, which includes risk mitigation data. Then through collaboration with micro cloud leader, the identified vehicles 320/330 can collaboratively coordinate and update the target speed data within the vehicular micro cloud 802.

Figure 9:
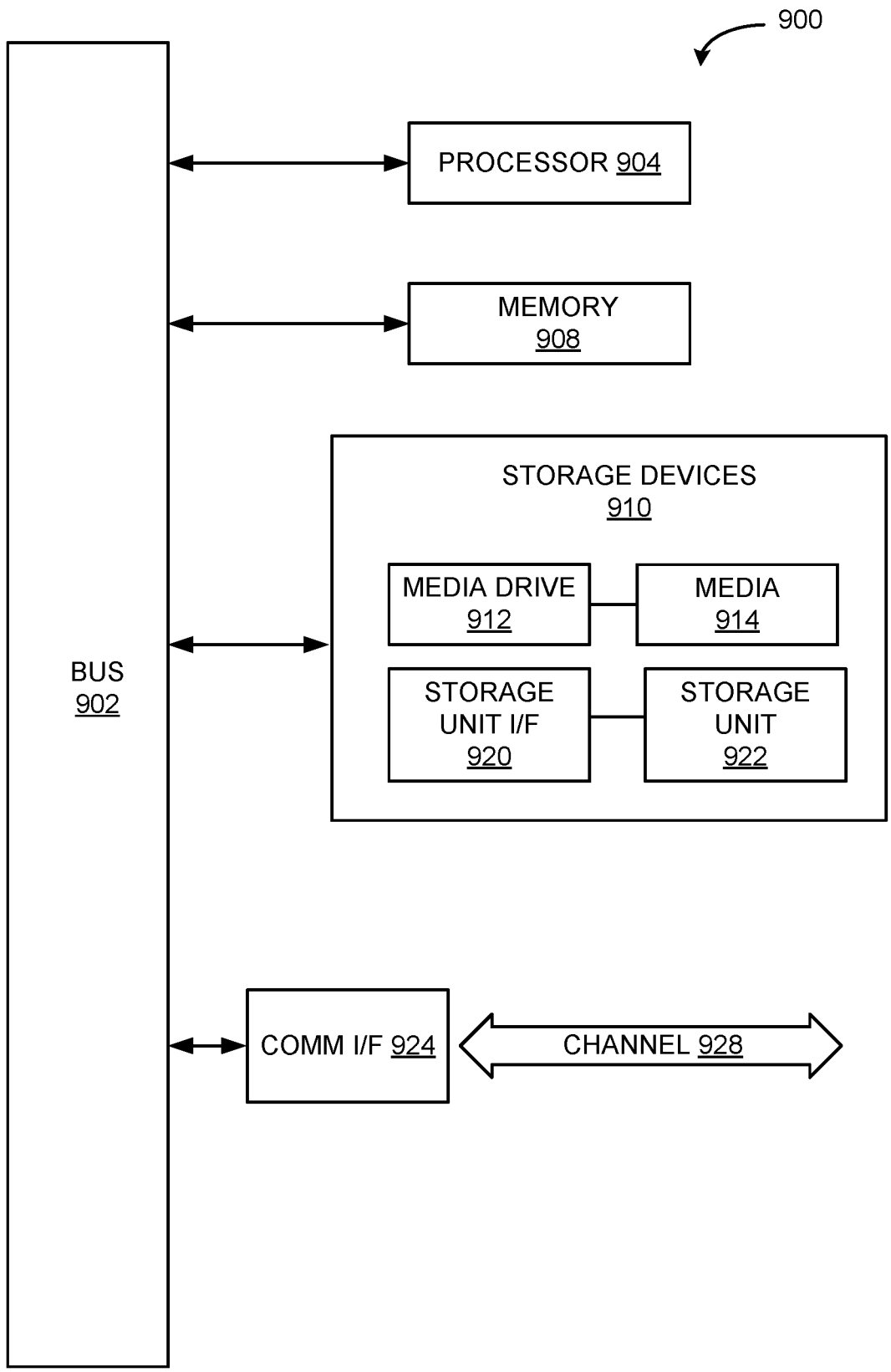
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up anomaly mitigation system 200 of FIG. 2 and/or server 310 of FIG. 3. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   responsive to receiving an indication that a first vehicle is exhibiting anomalous driving behavior, identifying a plurality of vehicles within a geographic area of the first vehicle;
   determining an arrangement for the plurality of vehicles based on the anomalous driving behavior of the first vehicle, wherein determining the arrangement comprises:
      determining a first subset of gaps between adjacent vehicles of the plurality of vehicles to form a path through the plurality of vehicles for the first vehicle to traverse, wherein a respective gap of the first subset of gaps exceeds a threshold distance determined to permit the first vehicle to traverse between, and
      determining a second subset of gaps between adjacent vehicles of the plurality of vehicles to form a border for the path the first vehicle cannot traverse, wherein a respective gap of the second subset of gaps is less than the threshold distance, and
      determining the arrangement based on the first and second subsets of gaps; and
   controlling the plurality of vehicles to distribute the plurality of vehicles into the determined arrangement.

2. The method of claim 1, wherein the path is based on the anomalous driving behavior of the first vehicle.

3. The method of claim 1, wherein the path passes through the determined arrangement.

4. The method of claim 1, wherein the arrangement comprises a platoon of the identified vehicles, wherein the path passes around the platoon.

5. The method of claim 1, wherein each of the identified vehicles comprises a lane position at a time that the anomalous driving behavior is indicated, and the determined arrangement maintains the lane position of each of the identified vehicles.

6. The method of claim 1, further comprising:
   in response to receiving the indication, predicting a movement pattern for the first vehicle,
   wherein determining the arrangement for the plurality of vehicles is based on the predicted movement pattern for the first vehicle.

7. The method of claim 4, further comprising:
   determining that the predicted movement pattern comprises a weaving pattern,
   wherein determining the arrangement is responsive to the determination that the predicted movement pattern comprises a weaving pattern.

8. The method of claim 4, wherein predicting the movement pattern is based on at least one of: current movement patterns of the indicated anomalous driving behavior and historical movement patterns unique to the first vehicle stored in a database.

9. The method of claim 8, wherein predicting the movement pattern further comprises:
   applying a machine learning model trained on time series analysis to the historical movement patterns to infer the predicted movement pattern.

10. The method of claim 1, further comprising:
    determining an influence region around the anomalous driving behavior based on computed risks to nearby vehicles, wherein the nearby vehicles comprises plurality of vehicles; and
    determining the plurality of vehicles are within the influence region.

11. A system comprising:
memory storing instructions; and
one or more processors communicably coupled to the memory and configured to execute the instructions to cause the system to:
responsive to receiving an indication that a first vehicle is exhibiting anomalous driving behavior, identify a plurality of vehicles within a geographic area of the first vehicle;
determine an arrangement for the plurality of vehicles based on the anomalous driving behavior of the first vehicle, wherein determining the arrangement comprises:
determining a subset of gaps between adjacent vehicles of the plurality of vehicles to form a path through the plurality of vehicles for the first vehicle to traverse, wherein a respective gap of the subset of gaps exceeds a threshold distance determined to permit the first vehicle to traverse between,
determining the arrangement based on the subset of gaps; and
controlling the plurality of vehicles to distribute the plurality of vehicles into the determined arrangement.

12. The system of claim 11, wherein each of the identified vehicles comprises a lane position at a time that the anomalous driving behavior is indicated, and the determined arrangement maintains the lane position of each of the identified vehicles.

13. The system of claim 11, wherein the one or more processors are further configured to execute the instructions to cause the system to:
predict a movement pattern for the first vehicle in response to receiving the indication,
wherein predicting the movement pattern is based on at least one of: current movement patterns of the indicated anomalous driving behavior and historical movement patterns unique to the first vehicle stored in a database, and
wherein the arrangement for the plurality of vehicles is determined based on the predicted movement pattern for the first vehicle.

14. The system of claim 13, wherein predicting the movement pattern further comprises:
applying a machine learning model trained on time series analysis to the historical movement patterns to infer the predicted movement pattern.

15. The system of claim 11, wherein the one or more processors are further configured to execute the instructions to cause the system to:
determine an influence region around the anomalous driving behavior based on computed risks to the plurality of vehicles; and
determine the plurality of vehicles are within the influence region.

16. Non-transitory machine-readable medium having instructions stored therein, which when executed by one or more processors, cause the one or more processors to perform operations comprising:
responsive to receiving an indication that a first vehicle is exhibiting anomalous driving behavior, identifying a plurality of vehicles within a geographic area of the first vehicle;
determining an arrangement for the plurality of vehicles based on the anomalous driving behavior of the first vehicle, wherein determining the arrangement comprises:
determining a subset of gaps between adjacent vehicles of the plurality of vehicles to form a path through the plurality of vehicles for the first vehicle to traverse, wherein a respective gap of the subset of gaps exceeds a threshold distance determined to permit the first vehicle to traverse between, and
determining the arrangement based on the subset of gaps; and
controlling the plurality of vehicles to distribute the plurality of vehicles into the determined arrangement.

17. The method of claim 1, further comprising determining the threshold distance based on a length of the first vehicle.

18. The system of claim 11, wherein determining the arrangement further comprises:
determining a second subset of gaps between adjacent vehicles of the plurality of vehicles to form a border for the path the first vehicle cannot traverse, wherein a respective gap of the second subset of gaps is less than the threshold distance, and
determining the arrangement based on the subset of gaps and the second subset of gaps.

19. The system of claim 18, wherein determining the arrangement further comprises determining the threshold distance based on a length of the first vehicle.

20. The non-transitory machine-readable medium of claim 16, wherein determining the arrangement further comprises:
determining a second subset of gaps between adjacent vehicles of the plurality of vehicles to form a border for the path the first vehicle cannot traverse, wherein a respective gap of the second subset of gaps is less than the threshold distance, and
determining the arrangement based on the subset of gaps and the second subset of gaps.

* * * * *